(12) United States Patent
Yamada et al.

(10) Patent No.: US 11,137,031 B2
(45) Date of Patent: Oct. 5, 2021

(54) BEARING PART, ROLLING BEARING, AND METHOD FOR MANUFACTURING BEARING PART

(71) Applicant: NTN CORPORATION, Osaka (JP)

(72) Inventors: Masahiro Yamada, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/490,856

(22) PCT Filed: Mar. 2, 2018

(86) PCT No.: PCT/JP2018/008149
§ 371 (c)(1),
(2) Date: Sep. 3, 2019

(87) PCT Pub. No.: WO2018/159840
PCT Pub. Date: Sep. 7, 2018

(65) Prior Publication Data
US 2020/0003259 A1    Jan. 2, 2020

(30) Foreign Application Priority Data

Mar. 3, 2017  (JP) .............................. JP2017-040524
Dec. 18, 2017  (JP) .............................. JP2017-241498

(51) Int. Cl.
*F16C 33/62* (2006.01)
*F16C 19/06* (2006.01)

(52) U.S. Cl.
CPC .............. *F16C 33/62* (2013.01); *F16C 19/06* (2013.01); *F16C 2204/70* (2013.01)

(58) Field of Classification Search
CPC .... C21D 1/06; C21D 9/36; C21D 9/40; C23C 8/32; C23C 8/80; F16C 19/06;
(Continued)

(56) References Cited

U.S. PATENT DOCUMENTS 5,084,116 A    1/1992  Mitamura
5,338,377 A    8/1994  Mitamura et al.
(Continued)

FOREIGN PATENT DOCUMENTS

CN    1421541 A    6/2003
CN    1611628 A    5/2005
(Continued)

OTHER PUBLICATIONS

International Search Report issued in corresponding International Patent Application No. PCT/JP2018/008149, dated May 1, 2018, with English translation.
(Continued)

*Primary Examiner* — Jenny R Wu
(74) *Attorney, Agent, or Firm* — McDermott Will & Emery LLP

(57) ABSTRACT

A bearing part is composed of a chromium molybdenum steel, and includes a raceway surface or a rolling contact surface. A precipitated compound composed of at least one of a carbide, a nitride, and a carbonitride exist in the raceway surface or the rolling contact surface. An area ratio of the precipitated compound in the raceway surface or the rolling contact surface is more than or equal to 3%. An average grain size of the precipitated compound in the raceway surface or the rolling contact surface is less than or equal to 0.3 μm.

12 Claims, 21 Drawing Sheets

(58) Field of Classification Search
CPC ...... F16C 2204/70; F16C 33/32; F16C 33/34; F16C 33/62; F16C 33/64
See application file for complete search history.

(56) References Cited

U.S. PATENT DOCUMENTS

| | | | |
|---|---|---|---|
| 5,660,647 A | 8/1997 | Mitamura et al. | |
| 5,672,014 A | 9/1997 | Okita et al. | |
| 5,853,249 A | 12/1998 | Maeda et al. | |
| 6,095,692 A | 8/2000 | Takemura | |
| 6,149,734 A | 11/2000 | Isogai et al. | |
| 6,290,398 B1* | 9/2001 | Fujiwara | C23C 8/02 384/492 |
| 8,535,457 B2 | 9/2013 | Maeda | |
| 2003/0123768 A1 | 7/2003 | Ohki | |
| 2008/0006347 A1* | 1/2008 | Kizawa | C23C 8/22 148/233 |
| 2008/0047633 A1* | 2/2008 | Kizawa | C23C 8/22 148/233 |
| 2008/0118196 A1* | 5/2008 | Watanabe | F16C 33/64 384/492 |
| 2012/0020605 A1 | 1/2012 | Mori | |
| 2014/0363115 A1 | 12/2014 | Yamada et al. | |
| 2016/0333438 A1 | 11/2016 | Sakamoto et al. | |

FOREIGN PATENT DOCUMENTS

| | | | |
|---|---|---|---|
| CN | 102362000 A | 2/2012 | |
| EP | 1517058 A1 * | 3/2005 | C21D 9/36 |
| JP | H2-277764 A | 11/1990 | |
| JP | H3-64431 A | 3/1991 | |
| JP | H05-078814 A | 3/1993 | |
| JP | H8-49057 A | 2/1996 | |
| JP | H08-303470 A | 11/1996 | |
| JP | H8-311603 A | 11/1996 | |
| JP | H11-201168 A | 7/1999 | |
| JP | H11-217626 A | 8/1999 | |
| JP | 2001-323939 A | 11/2001 | |
| JP | 2005-090680 A | 4/2005 | |
| JP | 2005-314789 A | 11/2005 | |
| JP | 2006-83988 A | 3/2006 | |
| JP | 2007-016848 A | 1/2007 | |
| JP | 2007-232201 A | 9/2007 | |
| JP | 2008-255399 A | 10/2008 | |
| JP | 2013-11010 A | 1/2013 | |
| JP | 2014101896 A * | 6/2014 | F16C 33/62 |
| WO | 2006/068205 A1 | 6/2006 | |
| WO | 2015/105187 A1 | 7/2015 | |

OTHER PUBLICATIONS

International Search Report issued in corresponding Intenational Patent Application No. PCT/JP2018/044709, dated Feb. 19. 2019, with English translation.

European Extended Search Report issued in corresponding European Patent Application No. 18760826.0, dated Jul. 3, 2020.

Japanese Office Action issued in corresponding Japanese Patent Application No. 2017-241498, dated Dec. 22, 2020, with English translation.

Chinese Office Action issued in corresponding Chinese Application/Patent No. 201880015417:1, dated Jun. 9, 2021, with English translation.

* cited by examiner

BEARING PART, ROLLING BEARING, AND METHOD FOR MANUFACTURING BEARING PART

CROSS-REFERENCE TO RELATED APPLICATIONS

This application is the U.S. National Phase under 35 U.S.C. § 371 of International Application No. PCT/JP2018/008149 filed on Mar. 2, 2018, which claims the benefit of Japanese Application No. 2017-241498, filed Dec. 28, 2017, and Japanese Application No. 2017-040524, filed Mar. 3, 2017, the entire contents of each are hereby incorporated by reference.

TECHNICAL FIELD

The present invention relates to a bearing part, a rolling bearing, and a method for manufacturing the bearing part. In particular, the present invention relates to: a bearing part used under an environment (foreign matter introduction environment) in which a foreign matter is likely to be introduced into a bearing; a rolling bearing; and a method for manufacturing the bearing part.

BACKGROUND ART

As a method for manufacturing a bearing part, the following method has been known: a formed body composed of a chromium molybdenum steel (SCM) is subjected to a carbonitriding process, a quenching process, and a tempering process in this order. However, the bearing part manufactured by the above-described manufacturing method does not have toughness and wear resistance sufficient to endure use under a foreign matter introduction environment. When used under the foreign matter introduction environment, the bearing part may be damaged at its surface and may have a life expired at an early stage.

To address this, a conventional general bearing part employs a steel material that contains about more than or equal to several % and less than or equal to ten several % of at least one from a group of elements that can form a carbonitride of each of silicon (Si), manganese (Mn), chromium (Cr), molybdenum (Mo), vanadium (V), titanium (Ti) and the like. By performing a predetermined heat treatment to the steel material, carbides and nitrides of the above-described added elements are precipitated in a raceway surface or rolling contact surface of the bearing part depending on the contents of the elements, thus resulting in improved wear resistance (for example, see Japanese Patent Laying-Open No. 2-277764, Japanese Patent Laying-Open No. 3-64431, Japanese Patent Laying-Open No. 8-49057, Japanese Patent Laying-Open No. 8-311603, Japanese Patent Laying-Open No. 11-201168, Japanese Patent Laying-Open No. 2001-323939, Japanese Patent Laying-Open No. 2007-232201, and Japanese Patent Laying-Open No. 2013-11010).

CITATION LIST

Patent Literature

PTL 1: Japanese Patent Laying-Open No. 2-277764
PTL 2: Japanese Patent Laying-Open No. 3-64431
PTL 3: Japanese Patent Laying-Open No. 8-49057
PTL 4: Japanese Patent Laying-Open No. 8-311603
PTL 5: Japanese Patent Laying-Open No. 11-201168
PTL 6: Japanese Patent Laying-Open No. 2001-323939
PTL 7: Japanese Patent Laying-Open No. 2007-232201
PTL 8: Japanese Patent Laying-Open No. 2013-11010

SUMMARY OF INVENTION

Technical Problem

However, the above-described steel material is expensive because the steel material contains various ratios of the elements that can form a carbonitride.

An object of the present invention is to provide: a bearing part that has wear resistance sufficient to endure use under a foreign matter introduction environment and that is manufactured at less cost than the conventional bearing part employing the above-described steel material; a rolling bearing; and a method for manufacturing the bearing part.

Solution to Problem

A bearing part according to the present invention is composed of a chromium molybdenum steel material, and includes a raceway surface or a rolling contact surface. Compound grains each composed of at least one of a carbide, a nitride, and a carbonitride exist in the raceway surface or the rolling contact surface. An area ratio of the compound grains in the raceway surface or the rolling contact surface is more than or equal to 3%. An average grain size of the compound grains in the raceway surface or the rolling contact surface is less than or equal to 0.3 μm.

The above-described bearing part is a bearing part composed of a chromium molybdenum steel and including a diffusion layer in a surface of the bearing part. The diffusion layer includes the plurality of compound grains and a plurality of martensite blocks. An average grain size of the compound grains is less than or equal to 0.3 μm. An area ratio of the compound grains in the diffusion layer is more than or equal to 3%. A maximum grain size of the plurality of martensite blocks is less than or equal to 3.8 μm.

In the bearing part, the plurality of martensite blocks may include martensite blocks each having a crystal grain size of less than or equal to 1.0 μm and constituting a first group. A value obtained by dividing a total area of the martensite blocks belonging to the first group by a total area of the plurality of martensite blocks may be more than or equal to 0.55 and less than or equal to 0.75.

In the bearing part, the plurality of martensite blocks may include martensite blocks belonging to a second group, and martensite blocks belonging to a third group. A minimum value of crystal grain sizes of the martensite blocks belonging to the third group may be larger than a maximum value of crystal grain sizes of the martensite blocks included in the second group. A value obtained by dividing a total area of the martensite blocks belonging to the third group by a total area of the plurality of martensite blocks may be more than or equal to 0.5. A value obtained by dividing, by the total area of the plurality of martensite blocks, a total area of the martensite blocks belonging to the third group except for a martensite block that has a maximum crystal grain size and that belongs to the third group may be less than 0.5. An average grain size of the martensite blocks belonging to the third group may be more than or equal to 0.7 μm and less than or equal to 1.4 μm.

In the bearing part, the plurality of martensite blocks may include martensite blocks belonging to a fourth group, and martensite blocks belonging to a fifth group. A minimum value of crystal grain sizes of the martensite blocks belonging to the fifth group may be larger than a maximum value of crystal grain sizes of the martensite blocks included in the fourth group. A value obtained by dividing a total area of the martensite blocks belonging to the fifth group by a total area of the plurality of martensite blocks may be more than or equal to 0.7. A value obtained by dividing, by the total area of the plurality of martensite blocks, a total area of the martensite blocks belonging to the fifth group except for a martensite block that has a maximum crystal grain size and that belongs to the fifth group may be less than 0.7. An average grain size of the martensite blocks belonging to the fifth group may be more than or equal to 0.6 μm and less than or equal to 1.1 μm.

In the bearing part, the plurality of martensite blocks may include martensite blocks belonging to a second group, and martensite blocks belonging to a third group. A minimum value of crystal grain sizes of the martensite blocks belonging to the third group may be larger than a maximum value of crystal grain sizes of the martensite blocks included in the second group. A value obtained by dividing a total area of the martensite blocks belonging to the third group by a total area of the plurality of martensite blocks may be more than or equal to 0.5. A value obtained by dividing, by the total area of the plurality of martensite blocks, a total area of the martensite blocks belonging to the third group except for a martensite block that has a maximum crystal grain size and that belongs to the third group may be less than 0.5. An average aspect ratio of the martensite blocks belonging to the third group may be more than or equal to 2.5 and less than or equal to 2.8.

In the bearing part, the plurality of martensite blocks may include martensite blocks belonging to a fourth group, and martensite blocks belonging to a fifth group. A minimum value of crystal grain sizes of the martensite blocks belonging to the fifth group may be larger than a maximum value of crystal grain sizes of the martensite blocks included in the fourth group. A value obtained by dividing a total area of the martensite blocks belonging to the fifth group by a total area of the plurality of martensite blocks may be more than or equal to 0.7. A value obtained by dividing, by the total area of the plurality of martensite blocks, a total area of the martensite blocks belonging to the fifth group except for a martensite block that has a maximum crystal grain size and that belongs to the fifth group may be less than 0.7. An average aspect ratio of the martensite blocks belonging to the fifth group may be more than or equal to 2.4 and less than or equal to 2.6.

In the bearing part, an average grain size of prior austenite crystal grains in the raceway surface or the rolling contact surface is less than or equal to 8 μm. In the bearing part, an average grain size of prior austenite crystal grains in the diffusion layer may be less than or equal to 8 μm.

In the bearing part, the compound grains include $(Fe,Cr)_3(C,N)$.

In the bearing part, an average carbon concentration of a shallow layer region extending from the raceway surface or the rolling contact surface to a depth of 10 μm is more than or equal to 0.7 weight %, and an average nitrogen concentration of the shallow layer region is more than or equal to 0.2 weight %.

In the bearing part, the chromium molybdenum steel may be SCM435 defined in JIS.

A rolling bearing according to the present invention includes: an outer ring; an inner ring disposed at an inner side relative to the outer ring; and a plurality of rolling elements arranged between the outer ring and the inner ring. At least one of the outer ring, the inner ring, and the rolling elements is the above-described bearing part. The rolling bearing includes: an outer ring that is composed of a chromium molybdenum steel and that has an inner circumferential surface provided with an outer ring raceway surface; an inner ring that is composed of the chromium molybdenum steel, that has an outer circumferential surface provided with an inner ring raceway surface, and that is disposed such that the second raceway surface faces the first raceway surface; and rolling elements that are each composed of the chromium molybdenum steel, and that are disposed to be rollable between the first raceway surface and the second raceway surface, and that have rolling contact surfaces. A diffusion layer is provided in at least one of the outer ring raceway surface, the inner ring raceway surface, and each rolling contact surface. The diffusion layer includes the plurality of compound grains and a plurality of martensite blocks. An average grain size of the compound grains is less than or equal to 0.3 μm. An area ratio of the compound grains in the diffusion layer is more than or equal to 3%. A maximum grain size of the martensite blocks is less than or equal to 3.8 μm.

A method for manufacturing a bearing part according to the present invention includes: preparing a formed body composed of a chromium molybdenum steel; carbonitriding the formed body by heating the formed body to more than or equal to 930° C. and less than or equal to 940° C. in a carbonitriding atmosphere including ammonia; primarily quenching the carbonitrided formed body by heating the formed body to a primary quenching temperature of more than or equal to 850° C. and less than 930° C. and then cooling the formed body to a temperature of less than or equal to a Ms point; secondarily quenching the primarily quenched formed body by heating the formed body to a secondary quenching temperature of more than or equal to an $A_1$ point and less than 850° C. and then cooling the formed body to the temperature of less than or equal to the Ms point.

In the method for manufacturing the bearing part, the primary quenching temperature is more than or equal to 860° C. and less than or equal to 880° C., and the secondary quenching temperature is more than or equal to 820° C. and less than or equal to 840° C.

Advantageous Effects of Invention

According to the present invention, there can be provided: a bearing part that has both toughness and wear resistance sufficient to endure use under a foreign matter introduction environment and that is manufactured at less cost than the conventional bearing part employing the above-described steel material that contains an element that can form a carbonitride; a rolling bearing; and a method for manufacturing the bearing part.

DESCRIPTION OF EMBODIMENTS

Figure 1:
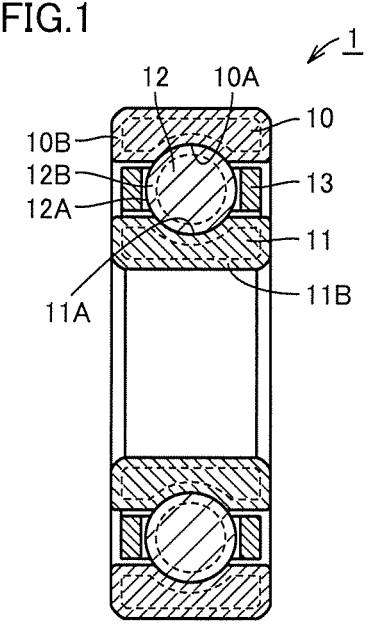
FIG. 1 is a cross sectional view showing a rolling bearing and a bearing part according to a first embodiment.

The following describes embodiments of the present invention with reference to figures. It should be noted that in the below-described figures, the same or corresponding portions are given the same reference characters and are not described repeatedly.

Configuration of Rolling Bearing According to First Embodiment

As shown in FIG. 1, a rolling bearing 1 according to a first embodiment mainly includes an outer ring 10, an inner ring 11, balls 12, and a cage 13. Each of outer ring 10, inner ring 11, and balls 12 corresponds to a bearing part according to the present embodiment. It should be noted that rolling bearing 1 is, for example, a deep groove ball bearing as shown in FIG. 1, but is not limited to this. Rolling bearing 1 may be a radial ball bearing such as an angular contact ball bearing, or may be a thrust ball bearing, a radial roller bearing, or a thrust roller bearing.

Outer ring 10 has an annular shape, and has an outer ring raceway surface 10A at its inner circumferential surface. Inner ring 11 has an annular shape and has an inner ring raceway surface 11A at its outer circumferential surface. Inner ring 11 is disposed at the inner circumferential side relative to outer ring 10 such that inner ring raceway surface 11A faces outer ring raceway surface 10A. Each of outer ring 10 and inner ring 11 is composed of a chromium molybdenum steel (SCM), such as SCM435.

Balls 12 are disposed on the inner circumferential surface of outer ring 10. Balls 12 are disposed side by side by, for example, cage 13 at a predetermined pitch on an annular raceway along the circumferential direction of each of outer ring 10 and inner ring 11. Balls 12 are held by cage 13 so as to be rollable on the raceway. Each of balls 12 has a ball rolling contact surface 12A and is in contact with outer ring raceway surface 10A and inner ring raceway surface 11A at ball rolling contact surface 12A. Ball 12 is composed of a SCM such as SCM435. Cage 13 is composed of a material including a synthetic resin, for example. With such a configuration, outer ring 10 and inner ring 11 of deep groove ball bearing 1 can be rotated relative to each other.

<Specific Configuration of Bearing Part>

The carbon concentration of a surface region 10B having a depth of less than or equal to 0.5 mm from outer ring raceway surface 10A of outer ring 10 is higher than the carbon concentration of an internal region of outer ring 10 having a depth of more than 0.5 mm from outer ring raceway surface 10A. The nitrogen concentration of surface region 10B having a depth of less than or equal to 0.5 mm from outer ring raceway surface 10A of outer ring 10 is higher than the nitrogen concentration of the internal region of outer ring 10.

Compound grains (precipitated compound) each composed of at least one of a carbide, a nitride, and a carbonitride exist in outer ring raceway surface 10A of outer ring 10. The area ratio of the precipitated compound in outer ring raceway surface 10A is more than or equal to 3%. The average grain size of the precipitated compound in outer ring raceway surface 10A is less than or equal to 0.3 µm. The precipitated compound includes iron (Fe) and chromium (Cr), and mainly includes $(Fe,Cr)_3(C,N)$.

Surface region 10B of outer ring 10 has an outer ring shallow layer region extending from outer ring raceway surface 10A to a depth of 10 µm, and the outer ring shallow layer region has an average carbon concentration of more than or equal to 0.7 weight %. The average nitrogen concentration of the outer ring shallow layer region is more than or equal to 0.2 weight %. It should be noted that the average carbon concentration (or average nitrogen concentration) in the shallow layer region is calculated by performing a line analysis for a cross section perpendicular to the raceway surface or the rolling contact surface in the depth direction by way of EPMA (Electron Probe Micro Analysis). The average carbon concentration (or average nitrogen concentration) in the shallow layer region is calculated as the average value of the carbon concentration (or nitrogen concentration) in the range from the raceway surface or the rolling contact surface to the depth of 10 µm.

The average grain size of prior austenite crystal grains in outer ring raceway surface 10A of outer ring 10 is less than or equal to 8 µm.

The carbon concentration of a surface region 11B having a depth of less than or equal to 0.5 mm from inner ring raceway surface 11A of inner ring 11 is higher than the carbon concentration of an internal region of inner ring 11 having a depth of more than 0.5 mm from inner ring raceway surface 11A. The nitrogen concentration of surface region 11B having a depth of less than or equal to 0.5 mm from inner ring raceway surface 11A of inner ring 11 is higher than the nitrogen concentration of the internal region of inner ring 11.

A precipitated compound composed of at least one of a carbide, a nitride, and a carbonitride exists in inner ring raceway surface 11A of inner ring 11. The area ratio of the precipitated compound in inner ring raceway surface 11A is more than or equal to 3%. The average grain size of the precipitated compound in inner ring raceway surface 11A is less than or equal to 0.3 µm. The precipitated compound includes iron (Fe) and chromium (Cr), and mainly includes $(Fe,Cr)_3(C,N)$.

Surface region 11B of inner ring 11 has an inner ring shallow layer region extending from inner ring raceway surface 11A to a depth of 10 µm, and the inner ring shallow layer region has an average carbon concentration of more than or equal to 0.7 weight %. The average nitrogen concentration of the inner ring shallow layer region is more than or equal to 0.2 weight %.

The average grain size of prior austenite crystal grains in inner ring raceway surface 11A of inner ring 11 is less than or equal to 8 µm.

The carbon concentration of a surface region 12B having a depth of less than or equal to 0.5 mm from ball rolling contact surface 12A of ball 12 is higher than the carbon concentration of an internal region of ball 12 having a depth of more than 0.5 mm from ball rolling contact surface 12A. The nitrogen concentration of surface region 12B having a depth of less than or equal to 0.5 mm from ball rolling contact surface 12A of ball 12 is higher than the nitrogen concentration of the internal region of ball 12.

A precipitated compound composed of at least one of a carbide, a nitride, and a carbonitride exists in ball rolling contact surface 12A of ball 12. The area ratio of the precipitated compound in ball rolling contact surface 12A is more than or equal to 3%. The average grain size of the precipitated compound in ball rolling contact surface 12A is less than or equal to 0.3 µm. The precipitated compound includes iron (Fe) and chromium (Cr), and mainly includes $(Fe,Cr)_3(C,N)$.

Surface region 12B of ball 12 has a ball shallow layer region extending from ball rolling contact surface 12A to a depth of 10 µm, and the ball shallow layer region has an average carbon concentration of more than or equal to 0.7 weight %. The average nitrogen concentration of the ball shallow layer region is more than or equal to 0.2 weight %.

The average grain size of prior austenite crystal grains in ball rolling contact surface 12A of ball 12 is less than or equal to 8 pin.

A thickness from outer ring raceway surface 10A of outer ring 10 to the outer circumferential surface is more than or equal to 10 mm, for example. A thickness from inner ring raceway surface 11A of inner ring 11 to the inner circumferential surface is more than or equal to 10 mm, for example. The diameter of ball 12 is more than or equal to 10 mm, for example.

It should be noted that the average grain size of the precipitated compound in each of the raceway surface and the rolling contact surface can be calculated from an electron microscope image of each of the raceway surface and the rolling contact surface, for example. The average grain size of the prior austenite crystal grains in each of the raceway surface and the rolling contact surface can be calculated from an optical microscope image of each of the raceway surface and the rolling contact surface, for example. In the present specification, the term "average grain size" refers to the arithmetic average of grain sizes of a sufficient number (for example, 20) of grains.

Moreover, the area ratio of the precipitated compound in each of the raceway surface and the rolling contact surface refers to a ratio of the total surface area of the precipitated compound in a region having a predetermined surface area in each of the raceway surface and the rolling contact surface, with respect to the surface area of this region. The region having the predetermined surface area in each of the raceway surface and the rolling contact surface refers to a region in an observation visual field when each of the raceway surface and the rolling contact surface is observed using a microscope or the like, for example. The total surface area of the precipitated compound is a total of areas of projection of the precipitated compound onto a plane perpendicular to a direction (substantially perpendicular direction) having an angle of 90°±2° relative to a surface having an observation region as confirmed when the observation region is seen in the direction.

<Method for Manufacturing Bearing Part and Rolling Bearing>

In a method for manufacturing rolling bearing 1 according to the first embodiment, respective formed bodies to serve as outer ring 10, inner ring 11, and ball 12 are first formed (step (S10)). In this step (S10), each of the formed bodies having predetermined shapes is formed by machining a SCM material. As the machining method, any method such as cutting or press working can be used.

Figure 2:
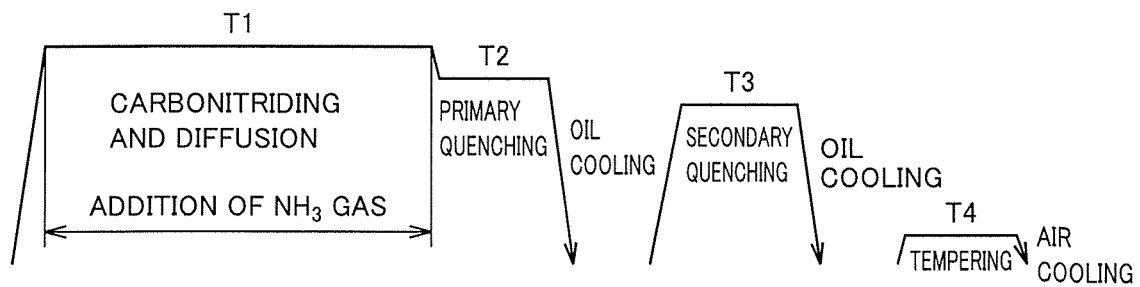
FIG. 2 illustrates a heat treatment method in a method for manufacturing the bearing part according to the first embodiment.

Next, heat treatment is performed to the formed body as shown in FIG. 2. The horizontal direction of FIG. 2 represents an elapsed time in the heat treatment step. It is indicated that a more time has elapsed at a more right side. The vertical direction of FIG. 2 represents a heating temperature of the formed body in the heat treatment step. It is indicated that the temperature is higher at a higher side.

In the heat treatment step, first, the formed member serving as a processing target is carbonitrided (step (S20)). In this step (S20), the formed body prepared in the previous step (S10) is heated to a carbonitriding temperature T1 of more than or equal to 930° C. and less than or equal to 940° C. in an atmosphere of an endothermic converted gas, such as R gas, together with introduced ammonia ($NH_3$) gas. Carbonitriding temperature T1 is a temperature of more than or equal to an $A_1$ point. The heating and holding time is more than or equal to 10 hours and less than or equal to 15 hours, for example. The atmosphere in this step (S20) is controlled using an amount of carbon monoxide (CO), an amount of carbon dioxide ($CO_2$), and an amount of undecomposed $NH_3$ in the atmosphere such that the amount of undecomposed ammonia (amount of $NH_3$ gas not decomposed and existing in the atmosphere) becomes more than or equal to 0.1 volume %, for example. Accordingly, the carbon concentration and nitrogen concentration of a region including a surface of the formed body thus carbonitrided become higher than the carbon concentration and nitrogen concentration of the other regions of this formed body.

Next, in the heat treatment step, a nitrogen diffusion process is performed to the carbonitrided formed body (step (S25)). In this step (S25), the formed body carbonitrided in the previous step (S20) is heated and held at carbonitriding temperature T1 in the atmosphere of the endothermic converted gas, such as R gas, together with the introduced ammonia ($NH_3$) gas, for example. The heating and holding time is more than or equal to 5 hours and less than or equal to 10 hours, for example. As with the above-described carbonitriding process, the atmosphere in this step (S25) is controlled using an amount of carbon monoxide (CO), an amount of carbon dioxide ($CO_2$), and an amount of undecomposed $NH_3$ in the atmosphere such that the amount of undecomposed ammonia becomes more than or equal to 0.1 volume %, for example. Regarding a defined in the following formulas (1) and (2), a in the nitrogen diffusion process is controlled to be lower than a in the carbonitriding process.

$$a_C^* = \frac{(P_{CO})^2}{K \times P_{CO_2}} \quad (1)$$

$P_{CO}$: partial pressure of carbon monoxide (atm) $P_{CO_2}$: partial pressure of carbon dioxide (atm) K: <C>+$CO_2$⇔Equilibrium Constant of 2CO $$\alpha = \frac{P_{NH_3}}{0.006 \times (P_H)^{\frac{3}{2}}} \times \frac{(1.877 - 1.055 \times a_C^*)}{100} \quad (2)$$

Next, in the heat treatment step, the carbonitrided formed body is primarily quenched (step (S30)). In this step (S30), the formed body having been through the nitrogen diffusion process in the previous step (S25) is heated and held for a predetermined time in an atmosphere including no ammonia gas at a primary quenching temperature T2 that is less than carbonitriding temperature T1 and that is sufficiently higher than the $A_1$ point, and is then cooled to fall within a temperature range of less than or equal to an $M_S$ point. On this occasion, the formed body having been heated at carbonitriding temperature T1 in the previous step (S25) is heated to primary quenching temperature T2 without being cooled to a temperature of less than the A1 point. Primary quenching temperature T2 is a temperature higher than 850° C., which is a general quenching temperature, in order to suppress the precipitated compound, which is mainly composed of $(Fe,Cr)_3(C,N)$, from being too large. Primary quenching temperature T2 is more than or equal to 860° C. and less than or equal to 880° C., for example. Primary quenching temperature T2 is 870° C., for example. The heating and holding time is more than or equal to 0.5 hour and less than or equal to 2 hours, for example. The cooling is oil cooling, for example.

Next, in the heat treatment step, the formed body having been primarily quenched is secondarily quenched (step (S40)). In this step (S40), the formed body quench-hardened in the previous step (S30) is heated and held at a secondary quenching temperature T3 that is more than or equal to the A1 point and less than primary quenching temperature T2, and is then cooled to a temperature of less than or equal to the Ms point. Secondary quenching temperature T3 is less than 850° C. Secondary quenching temperature T3 is more than or equal to 820° C. and less than or equal to 840° C., for example. Secondary quenching temperature T3 is 830° C., for example. The heating time is more than or equal to 1 hour and less than or equal to 2 hours, for example. The cooling is oil cooling, for example.

Next, in the heat treatment step, a tempering process is performed (step (S50)). In this step (S50), the formed body quench-hardened in the previous step (S40) is heated to a tempering temperature T4 of less than or equal to the A1 point, thereby performing the tempering process. Tempering temperature T4 is more than or equal to 150° C. and less than or equal to 350° C., for example. Tempering temperature T4 is 180° C., for example. The heating and holding time is more than or equal to 0.5 hour and less than or equal to 5 hours, for example. With the above steps, the heat treatment step is completed.

Next, the formed body having been through the heat treatment step is finish-processed (step (S60)). In this step (S60), a finish process such as polishing is performed to a surface of the formed body, for example. It should be noted that an amount of processing in the finish process, i.e., the depth of a position to serve as a surface of the mechanical part relative to the surface of the formed body, is 250 μm, for example. In this way, outer ring 10, inner ring 11, and ball 12 each serving as the bearing part according to the first embodiment are manufactured.

Next, outer ring 10, inner ring 11, and balls 12 are assembled (step (S70)). In this step (S70), outer ring 10, inner ring 11, balls 12, and cage 13 prepared separately are assembled. In this way, deep groove ball bearing 1 shown in FIG. 1 is manufactured.

<Function and Effect>

The method for manufacturing the bearing part according to the first embodiment includes: preparing (S10) a formed body composed of a chromium molybdenum steel; carbonitriding (S20) the formed body by heating the formed body to more than or equal to 930° C. and less than or equal to 940° C. in a carbonitriding atmosphere including ammonia; primarily quenching (S30) the carbonitrided formed body by heating the formed body to a primary quenching temperature of more than 850° C. and less than 930° C. and then cooling the formed body to a temperature of less than or equal to a Ms point; and secondarily quenching (S40) the primarily quenched formed body by heating the formed body to a secondary quenching temperature of more than or equal to an $A_1$ point and less than 850° C. and then cooling the formed body to the temperature of less than or equal to the Ms point.

Preferably, primary quenching temperature T2 is higher than a general primary quenching temperature of 850° C. in a method for manufacturing a bearing part composed of a bearing steel, and is more than or equal to 860° C. and less than or equal to 880° C., for example. By setting primary quenching temperature T2 in this way, the above-described precipitated compound can be suppressed from being too large in the bearing part composed of a SCM material. Preferably, secondary quenching temperature T3 is lower than the general primary quenching temperature of 850° C. in the method for manufacturing the bearing part composed of a bearing steel, and is more than or equal to 820° C. and less than or equal to 840° C., for example. In the formed body upon the secondary quenching process, the concentrations of carbon and nitrogen dissolved in its base material in a solid state are decreased to be lower than those upon the primary quenching process, with the result that the above-described precipitated compound is less likely to be formed. To address this, by setting secondary quenching temperature T3 to fall within the above-described numerical value range, a large amount of the fine precipitated compound can be formed.

The present inventors have confirmed that each of outer ring 10, inner ring 11, and ball 12, each of which is obtained by the method for manufacturing the bearing part according to the first embodiment, has the following features (for details, see Example 1 below).

The precipitated compound composed of at least one of a carbide, a nitride, and a carbonitride exists in each of outer ring raceway surface 10A, inner ring raceway surface 11A, and ball rolling contact surface 12A. The area ratio of the precipitated compound in each of outer ring raceway surface 10A, inner ring raceway surface 11A, and ball rolling contact surface 12A is more than or equal to 3%. This value is higher than that of the conventional bearing part that is composed of a steel for carburization and that is manufactured by performing the conventional heat treatment step. Further, the average grain size of the precipitated compound is less than or equal to 0.3 μm. This value is smaller than that of the conventional bearing part. Thus, each of such outer ring 10, inner ring 11, and ball 12 has a higher wear resistance than that of the conventional bearing part. Even when used under the foreign matter introduction environment, each of outer ring raceway surface 10A, inner ring raceway surface 11A, and ball rolling contact surface 12A is less likely to be damaged and has a long life.

Further, each of outer ring 10, inner ring 11, and ball 12 according to the first embodiment is composed of the SCM material and is therefore manufactured with less cost than the conventional bearing part employing the above-described steel material containing an element that can form a carbonitride.

In the above-described bearing part, the average grain size of the prior austenite crystal grains is less than or equal to 8 μm. This value is smaller than that of the conventional bearing part. Thus, each of such outer ring 10, inner ring 11, and ball 12 has a higher toughness than that of the conventional bearing part. It should be noted that in the conventional bearing part composed of a steel for carburization, the content of the element that can form a carbonitride needs to be high in order to increase the amounts of precipitation of carbide and nitride to improve the wear resistance. However, as the content of the element that can form a carbonitride is higher, the toughness of the bearing part tends to be decreased. Therefore, in the conventional bearing part, it is difficult to achieve both toughness and wear resistance sufficient to endure use under the foreign matter introduction environment. On the other hand, in each of outer ring 10, inner ring 11, and ball 12 described above, a larger amount of the above-described precipitated compound exists in each of surface regions 10B, 11B, 12B than that in the conventional bearing part, and the prior austenite crystal grains are fine. Hence, both toughness and wear resistance sufficient to endure use under the foreign matter introduction environment are achieved. Thus, each of outer ring 10, inner ring 11, and ball 12 has a long life even when used under the foreign matter introduction environment.

Further, in the bearing part, the precipitated compound is composed of a material including $(Fe,Cr)_3(C,N)$.

In the bearing part, the shallow layer region extending from each of outer ring raceway surface 10A, inner ring raceway surface 11A, and ball rolling contact surface 12A to the depth of 10 μm has an average carbon concentration of more than or equal to 0.7 weight %, and has an average nitrogen concentration of more than or equal to 0.2 weight %. These values are more than or equal to those of the conventional bearing part. This indicates that in the bearing part, large amounts of at least two of the carbide, the nitride, and the carbonitride are precipitated in the shallow layer region than those in the conventional bearing part.

<Modification>

At least one of outer ring 10, inner ring 11, and ball 12 may be composed of the SCM material, the carbonitride may be precipitated in each of the raceway surfaces and the rolling contact surface, the area ratio of the carbonitride may be more than or equal to 3%, and the average grain size of the carbonitride may be less than or equal to 0.3 μm.

Example 1

The following describes an experiment performed to confirm the effects of the bearing part and the rolling bearing according to the present disclosure.

<Sample 1>

A sample 1 was produced in accordance with the method for manufacturing the bearing part according to the first embodiment. Specifically, first, there was prepared a formed body that was composed of SCM435 in JIS and that was formed to have a shape of an inner ring of a rolling bearing. Next, the formed body was subjected to the carbonitriding process, the primary quenching process, the secondary quenching process, and the tempering process in this order.

In the carbonitriding process, a mixed gas of R gas and $NH_3$ gas was used, a carbonitriding process temperature was set to more than or equal to 930° C. and less than or equal to 940° C., and a heating and holding time was set to 13 hours. A furnace atmosphere in the carbonitriding process was controlled using an amount of carbon monoxide (CO), an amount of carbon dioxide ($CO_2$), and an amount of $NH_3$ in the atmosphere. The amount of CO was set to more than or equal to 11 volume % and less than or equal to 17 volume %, the amount of $CO_2$ was set to more than or equal to 0.05 volume % and less than or equal to 0.15 volume %, and the amount of NH$_3$ was set to more than or equal to 0.1 volume % and less than or equal to 0.3 volume %.

In the diffusion process, a mixed gas of R gas and NH$_3$ gas was used, a diffusion process temperature was set to more than or equal to 930° C. and less than or equal to 940° C., and a heating and holding time was set to 6 hours. As with the carbonitriding process, a furnace atmosphere in the diffusion process was controlled using an amount of carbon monoxide (CO), an amount of carbon dioxide (CO$_2$), and an amount of NH$_3$ in the atmosphere. The amount of CO was set to more than or equal to 11 volume % and less than or equal to 17 volume %, the amount of CO$_2$ was set to more than or equal to 0.05 volume % and less than or equal to 0.15 volume %, and the amount of NH$_3$ was set to more than or equal to 0.1 volume % and less than or equal to 0.3 volume %. α in the nitrogen diffusion process was controlled to be lower than a in the carbonitriding process.

In the primary quenching process, the primary quenching temperature was set to 870° C. and the heating and holding time was set to 1 hour. For cooling, oil cooling was employed.

In the secondary quenching process, the secondary quenching temperature was set to 830° C. and the heating and holding time was set to 1.5 hours. For cooling, oil cooling was employed.

In the tempering process, the tempering temperature was set to 180° C. and the heating and holding time was set to 3 hours. For cooling, air cooling was employed.

Each of the formed bodes having been through the above-described heat treatment was finish-processed. For the finish process, mechanical polishing was performed. An amount of polishing was set to 150 μm.

<Sample 2>

As a comparative example, a sample 2 was produced in accordance with the method for manufacturing the conventional bearing part. Specifically, first, there were prepared formed bodies that were each composed of SCM435 in JIS and that were formed to have respective shapes of an outer ring, an inner ring, and a roller of a rolling bearing. Next, each of the formed bodies was subjected to the carbonitriding process, the quenching process, and the tempering process in this order.

In the carbonitriding process, a mixed gas of R gas and NH$_3$ gas was used, a carbonitriding process temperature was set to more than or equal to 930° C. and less than or equal to 940° C., and a heating and holding time was set to 8 hours. A furnace atmosphere in the carbonitriding process was controlled using an amount of carbon monoxide (CO), an amount of carbon dioxide (CO$_2$), and an amount of NH$_3$ in the atmosphere. The amount of CO was set to more than or equal to 16 volume % and less than or equal to 22 volume %, the amount of CO$_2$ was set to more than or equal to 0.2 volume % and less than or equal to 0.4 volume %, and the amount of NH$_3$ was set to more than or equal to 0.1 volume % and less than or equal to 0.3 volume %.

In the diffusion process, a mixed gas of R gas and NH$_3$ gas was used, a diffusion process temperature was set to more than or equal to 930° C. and less than or equal to 940° C., and a heating and holding time was set to 4 hours. A furnace atmosphere in the diffusion process was controlled using an amount of carbon monoxide (CO), an amount of carbon dioxide (CO$_2$), and an amount of NH$_3$ in the atmosphere. The amount of CO was set to more than or equal to 16 volume % and less than or equal to 22 volume %, the amount of CO$_2$ was set to more than or equal to 0.2 volume % and less than or equal to 0.4 volume %, and the amount of NH$_3$ was set to more than or equal to 0.1 volume % and less than or equal to 0.3 volume %. α in the nitrogen diffusion process was controlled to be lower than a in the carbonitriding process.

In the quenching process, the quenching temperature was set to 870° C. and the heating and holding time was set to 1 hour. For cooling, oil cooling was employed.

In the tempering process, the tempering temperature was set to 180° C. and the heating and holding time was set to 3 hours. For cooling, air cooling was employed.

Each of the formed bodes having been through the above-described heat treatment was finish-processed. For the finish process, mechanical polishing was performed. An amount of polishing was set to 150 μm.

<Evaluation>

(1) Electron Probe MicroAnalyzer (EPMA) Analysis

Figure 3:
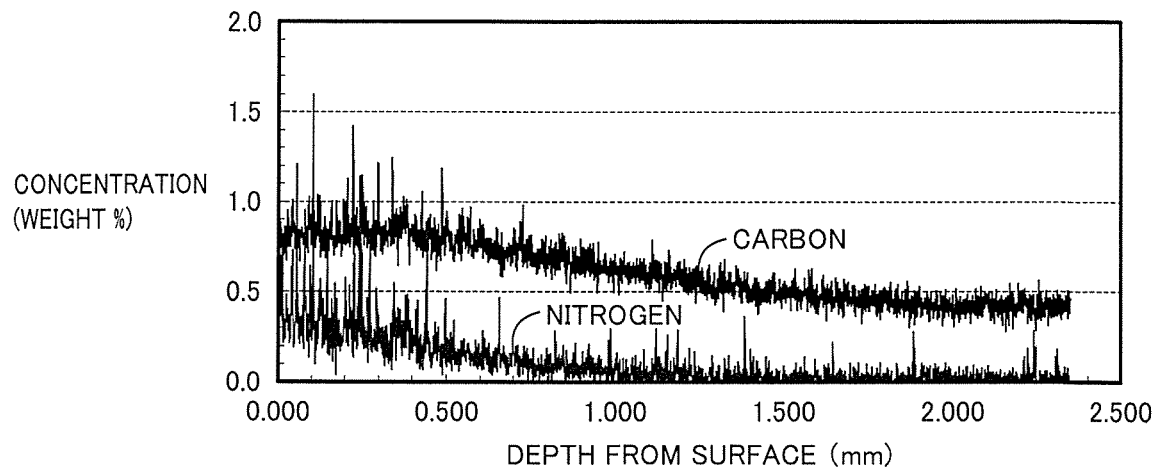
FIG. 3 is a graph showing concentration distributions of carbon and nitrogen in an inner ring of a sample 1 of Example 1.
Figure 4:
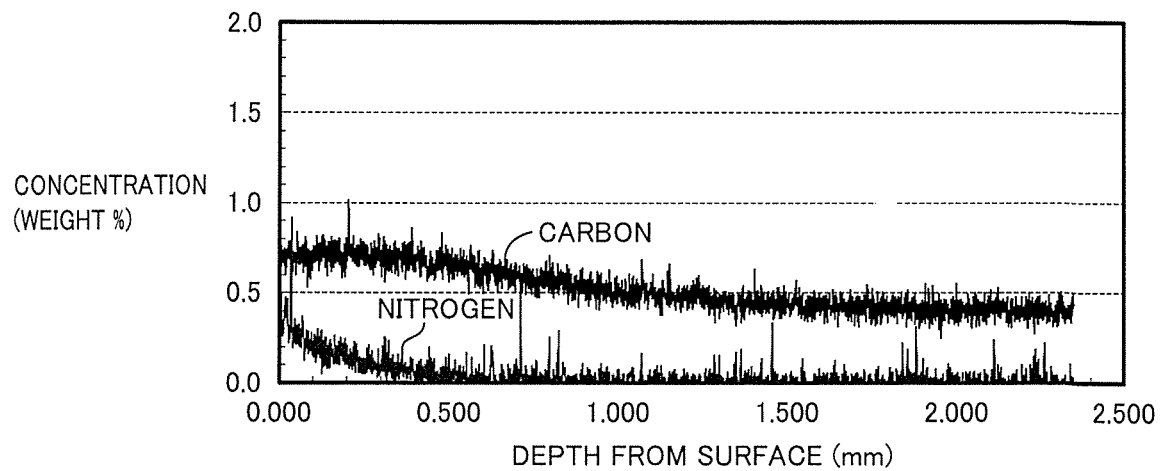
FIG. 4 is a graph showing concentration distributions of carbon and nitrogen in an inner ring of a sample 2 of Example 1.

An EPMA was used to evaluate the carbon concentration distribution and nitrogen concentration distribution of the surface region of the inner ring of each of samples 1 and 2. FIG. 3 shows a result of the analysis on the inner ring of sample 1, whereas FIG. 4 shows a result of the analysis on the inner ring of sample 2. The horizontal axis of each of FIG. 3 and FIG. 4 represents a depth [unit: mm] from the surface thereof, whereas the vertical axis of each of FIG. 3 and FIG. 4 represents the carbon and nitrogen concentrations [unit: weight %].

As shown in FIG. 3, in sample 1 serving as the example of the present disclosure, a multiplicity of sharp peaks in the carbon concentration and nitrogen concentration were confirmed in the surface region extending from the surface to a depth of 0.5 mm. Accordingly, it was confirmed that a large amount of the precipitated compound composed of at least one of a carbide, a nitride, and a carbonitride existed in the surface region, and the precipitated compound was suppressed from being coarse.

Moreover, in sample 1, it was confirmed that: the average carbon concentration of the shallow layer region extending from the surface to the depth of 10 μm was more than or equal to 0.7 weight % and less than or equal to 1.2 weight %; and the average nitrogen concentration of the shallow layer region was more than or equal to 0.2 weight % and less than or equal to 0.4 weight %. Further, in sample 1, it was confirmed that carburized depth and nitrided depth were about more than or equal to 1.0 mm and less than or equal to 1.5 mm.

As shown in FIG. 4, in sample 2 serving as the comparative example, a multiplicity of sharp peaks in the carbon concentration and nitrogen concentration were not confirmed in the surface region extending from the surface to a depth of 0.5 mm. It was confirmed that a large amount of the precipitated compound composed of at least one of a carbide, a nitride, and a carbonitride did not exist in the surface region of sample 2.

Moreover, in sample 2, it was confirmed that: the average carbon concentration of the shallow layer region extending from the surface to a depth of 10 μm was more than or equal to 0.7 weight % and less than or equal to 0.8 weight %; and the average nitrogen concentration of the shallow layer region was more than or equal to 0.2 weight % and less than or equal to 0.4 weight %. Further, in sample 2, it was confirmed that the carburized depth and the nitrided depth were about more than or equal to 1.0 mm and less than or equal to 1.5 mm.

Moreover, from the EPMA analysis, it was confirmed that the precipitated compound of sample 1 was mainly $(Fe,Cr)_3(C,N)$.

In view of the above results, it was confirmed that: sample 1 had the carburized depth and nitrided depth comparable to those of sample 2; and a larger amount of the precipitated compound, $(Fe,Cr)_3(C,N)$, than that of sample 2 existed in the surface region of sample 1.

(2) Electron Microscope Observation

Figure 5:
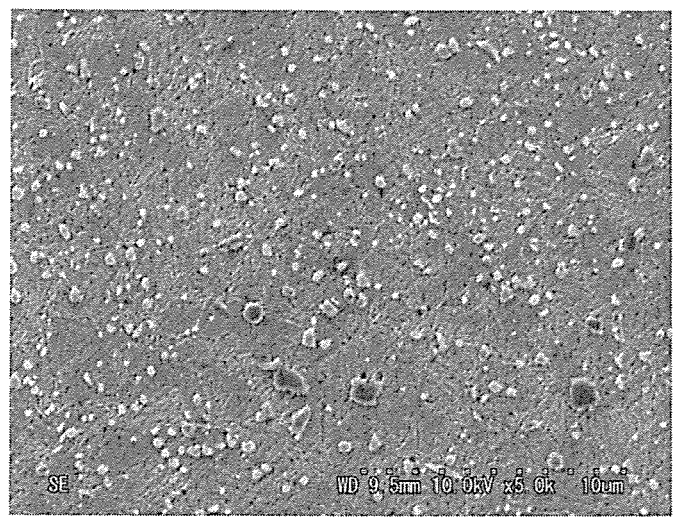
FIG. 5 shows an electron microscope image of a surface of the inner ring of sample 1 of Example 1.
Figure 6:
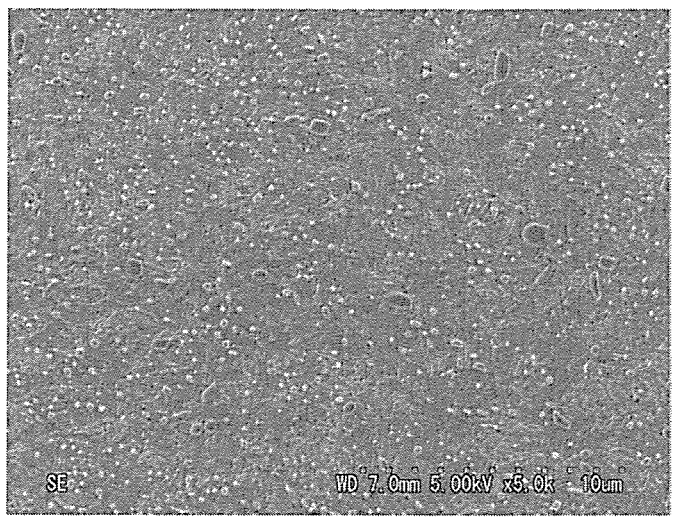
FIG. 6 shows an electron microscope image of a surface of a roller of sample 1 of Example 1.
Figure 7:
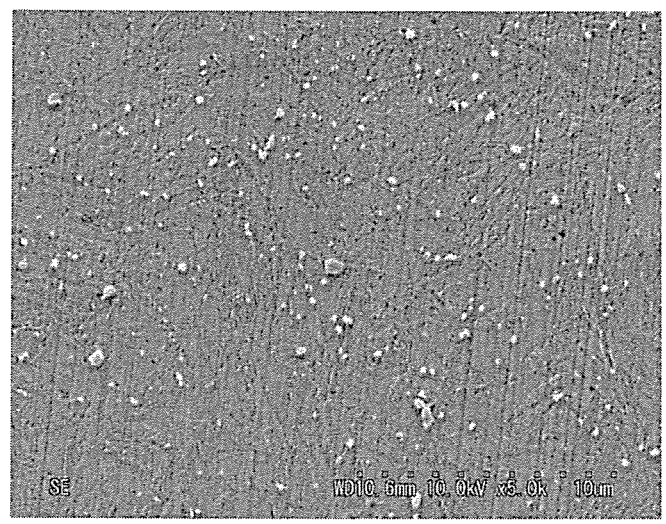
FIG. 7 shows an electron microscope image of a surface of the inner ring of sample 2 of Example 1.

The surface of each of the inner rings and the rollers of samples 1 and 2 was observed using an electron microscope. FIG. 5 shows an electron microscope image of the inner ring of sample 1, and FIG. 6 shows an electron microscope image of the roller of sample 1. FIG. 7 shows an electron microscope image of the inner ring of sample 2, and FIG. 8 shows an electron microscope image of the roller of sample 2.

As shown in FIG. 5 and FIG. 6, it was confirmed that a large amount of precipitated compound having an average grain size of more than or equal to 0.2 μm and less than or equal to 0.3 μm existed in the surface of sample 1. Further, it was confirmed that the ratio (area ratio) of the total surface area of the precipitated compound to the area of the visual field shown in FIG. 5 and FIG. 6 was more than or equal to 3% and less than or equal to 10%.

Figure 8:
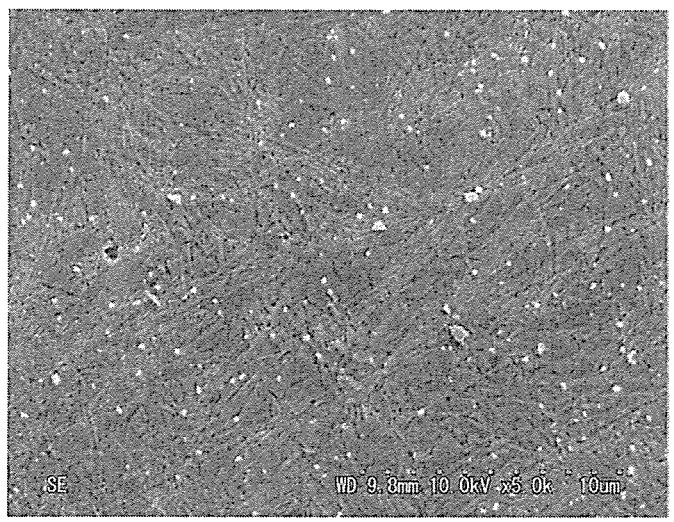
FIG. 8 shows an electron microscope image of a surface of a roller of sample 2 of Example 1.

As shown in FIG. 7 and FIG. 8, it was confirmed that a slight amount of the precipitated compound having an average grain size of more than or equal to 0.1 μm and less than or equal to 0.2 μm existed in the surface of sample 2. Further, it was confirmed that the ratio (area ratio) of the total surface area of the precipitated compound to the area of the visual field shown in FIG. 7 and FIG. 8 was about 1%.

In view of the above results, it was confirmed that a larger amount of the precipitated compound than that in sample 2 existed in sample 1. Moreover, it was confirmed that the large amount of the precipitated compound of sample 1 had a fine structure.

(3) Optical Microscope Observation

Figure 9:
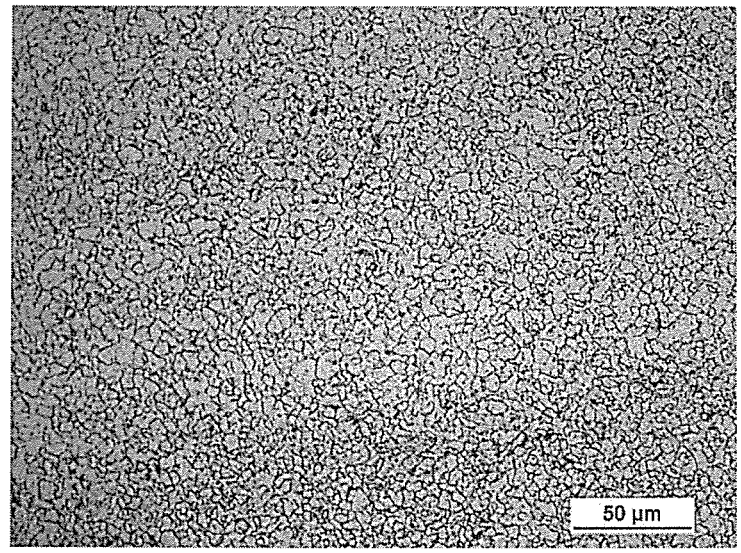
FIG. 9 shows an optical microscope image of the surface of the inner ring of sample 1 of Example 1.
Figure 10:
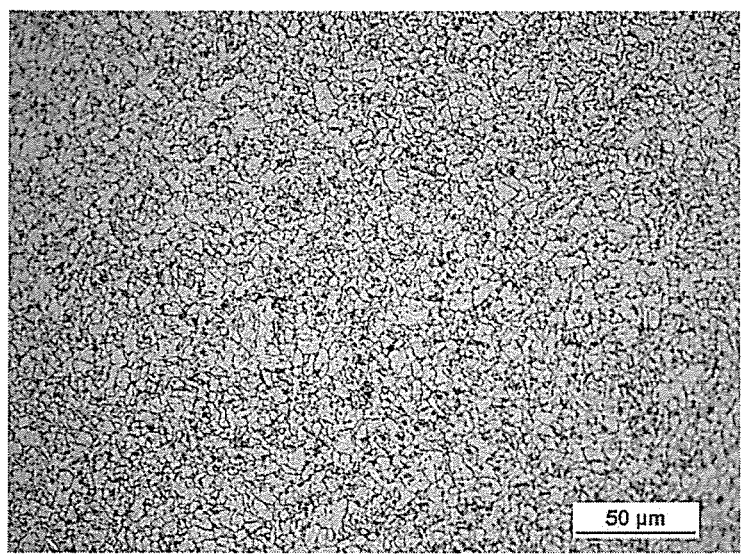
FIG. 10 shows an optical microscope image of the surface of the roller of sample 1 of Example 1.
Figure 11:
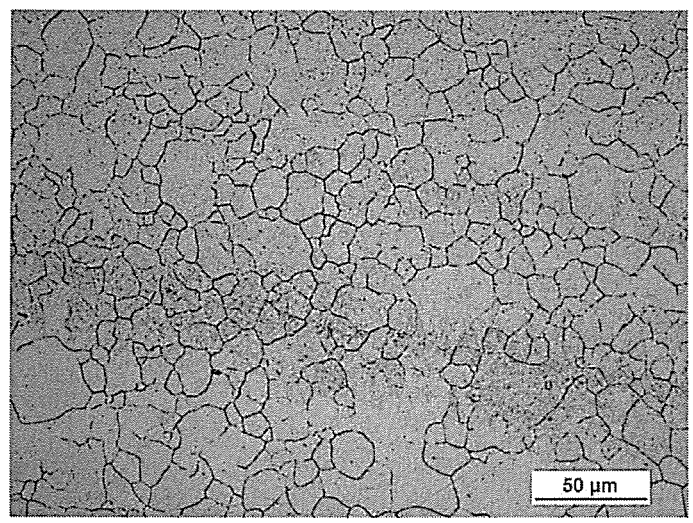
FIG. 11 shows an optical microscope image of the surface of the inner ring of sample 2 of Example 1.

The surface of each of the inner rings and the rollers of samples 1 and 2 was observed using an optical microscope. FIG. 9 shows an optical microscope image of the inner ring of sample 1, and FIG. 10 shows an optical microscope image of the roller of sample 1. FIG. 11 shows an optical microscope image of the inner ring of sample 2, and FIG. 12 shows an optical microscope image of the roller of sample 2.

As shown in FIG. 9 and FIG. 10, it was confirmed that: each of the grain sizes of the prior austenite crystal grains in the surface of sample 1 was more than or equal to 1 μm and less than or equal to 10 μm; and the average grain size thereof was more than or equal to 4 μm and less than or equal to 8 μm.

Figure 12:
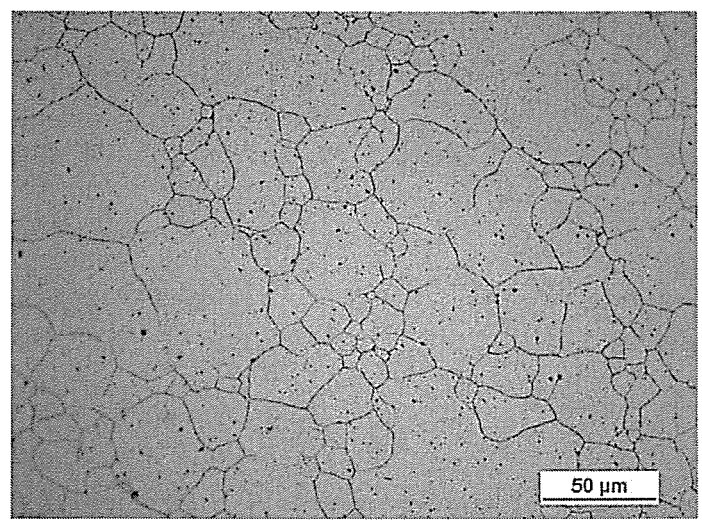
FIG. 12 shows an optical microscope image of the surface of the roller of sample 2 of Example 1.

As shown in FIG. 11 and FIG. 12, it was confirmed that: each of the grain sizes of the prior austenite crystal grains in the surface of sample 2 was more than or equal to 5 μm and less than or equal to 100 μm; and the average grain size thereof was more than or equal to 12 μm and less than or equal to 25 μm.

In view of the above results, it was confirmed that the prior austenite crystal grains in sample 1 were finer than those in sample 2. Also, it was confirmed that variation in the grain sizes of the prior austenite crystal grains in sample 1 was smaller than that in sample 2.

(4) Wear Test

A Saving type wear testing machine was used to perform a wear test onto the following specimens: a specimen 1 serving as the example of the present disclosure and prepared by the same method as that for sample 1 described above; and a specimen 2 serving as the comparative example and prepared by the same method as that for sample 2 described above. Each of specimens 1 and 2 had a flat-plate-like shape. Each of specimens 1 and 2 had a surface roughness Ra of 0.010 μm. A load during the test was set to 50 N, a relative speed between the specimen and a counterpart material was set to 0.05 m/s, a test time was set to 60 minutes, and Mobil Velocite Oil No. 3 (registered trademark) (VG2) was employed as lubricating oil. From a wear amount of each of the specimens after the end of the test, a specific wear amount was calculated and a wear resistance was evaluated.

Figure 13:
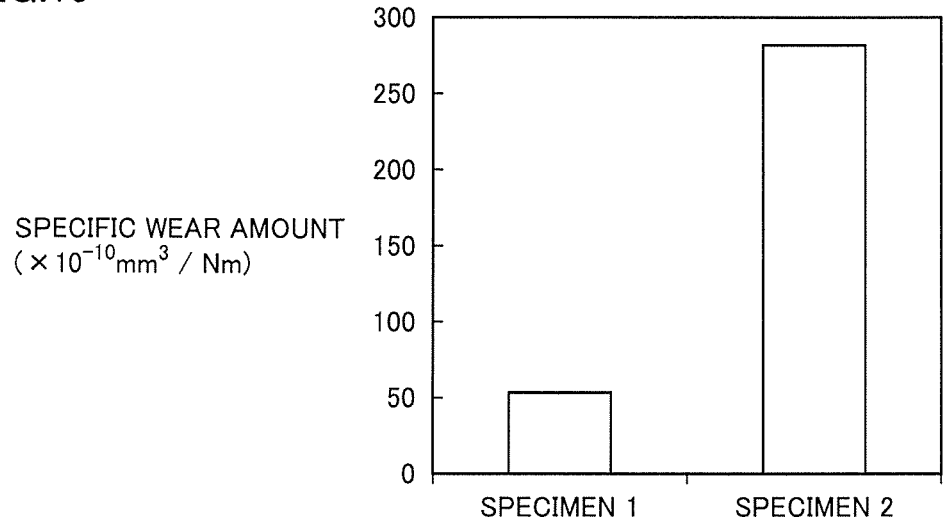
FIG. 13 is a graph showing a result of a wear resistance test on each of specimens 1 and 2 of Example 1.

FIG. 13 shows specific wear amounts of specimens 1 and 2 [unit: $\times 10^{-10}$ mm$^3$/N·m]. As shown in FIG. 13, it was confirmed that the specific wear amount of specimen 1 was reduced to about 20% of that of specimen 2. As with sample 1 in the above-described example of the present disclosure, it is considered that specimen 1 had a high wear resistance because the larger amount of the fine precipitated compound existed in the surface region of specimen 1 than that in specimen 2.

(5) Charpy Impact Test

In accordance with JIS Z2242, a Charpy impact test was performed onto the following specimens: a specimen 3 serving as the example of the present disclosure and prepared by the same method as that for sample 1 described above; and a specimen 4 serving as the comparative example and prepared by the same method as that for sample 2. Each of specimens 3 and 4 was provided with a U-notch having a notch depth of 2 mm and a notch bottom curvature radius of 1 mm.

Figure 14:
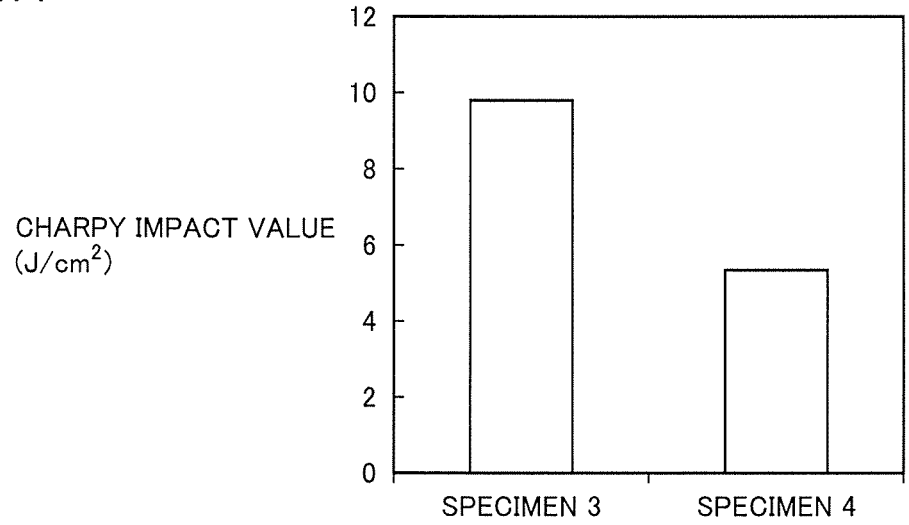
FIG. 14 is a graph showing a result of a Charpy impact test on each of specimens 3 and 4 of Example 1.

FIG. 14 shows a Charpy impact value of each of specimens 3 and 4 [unit: J/cm$^2$]. As shown in FIG. 14, it was confirmed that specimen 3 had a Charpy impact value 1.5 times or more as large as that of specimen 4, and had a high toughness. Thus, specimen 3 had such a high toughness presumably due to the following reason: as with sample 1 described above, fine prior austenite crystal grains less varied in grain sizes existed in the surface region of specimen 3.

(6) Rolling Fatigue Life Test Under Lubricating Condition with Foreign Matter Introduced A rolling fatigue life test under a lubricating condition with a foreign matter introduced was performed onto the following tapered roller bearings: a tapered roller bearing that was a sample 3 serving as an example of the present disclosure, that was prepared by the same method as that for sample 1 described above, and that was according to JIS 30206; and a tapered roller bearing that was a sample 4 serving as a comparative example, that was prepared by the same method as that for sample 2 described above, and that was according to JIS 30206. In this life test, the outer ring was fixed and the inner ring was rotated at a rotating speed of 2000 rpm under the following conditions: bath lubrication was employed using turbine oil VG56 as the lubricating oil; a load was set to 17 kN; and an outer ring temperature was set to 65° C. Then, a period of time (life) from the start of the test until occurrence of flaking was inspected and statistically analyzed so as to calculate an $L_{10}$ life and an $L_{50}$ life. The $L_{10}$ life is a life when a cumulative failure probability is 10%, and the $L_{50}$ life is a life when the cumulative failure probability is 50%.

Figure 15:
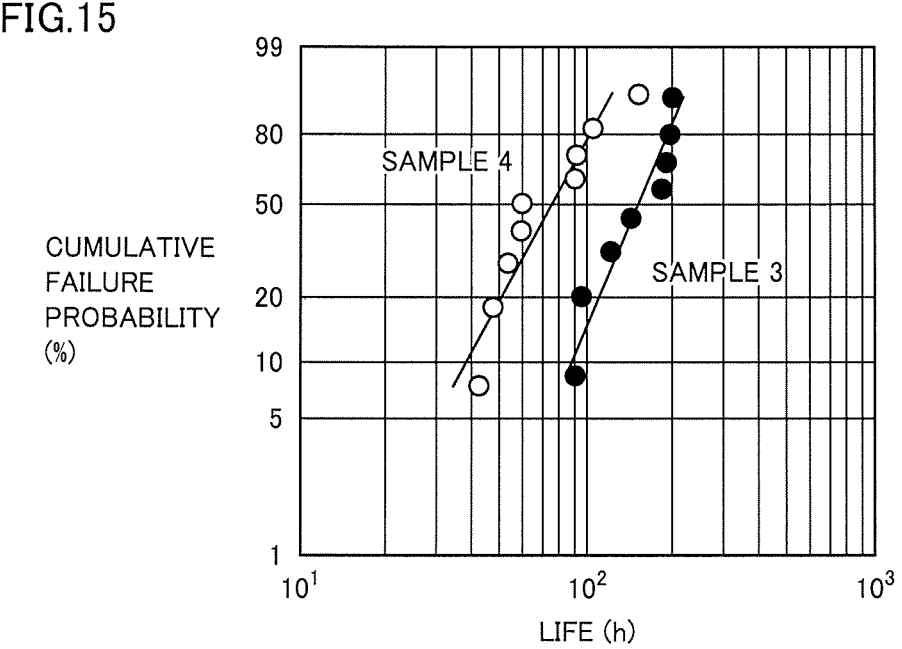
FIG. 15 is a graph showing a result of a life test when a foreign matter is introduced into lubricating oil of each of rolling bearings of samples 3 and 4 of Example 1.

FIG. 15 shows results of the life test on sample 3 serving as the example of the present disclosure and sample 4 serving as the comparative example. The horizontal axis of FIG. 15 represents the life [unit: time], whereas the vertical axis of FIG. 15 represents the cumulative failure probability [unit: %]. As shown in FIG. 15, in the comparative example, the $L_{10}$ life was 38 hours and the $L_{50}$ life was 76 hours, whereas in the example of the present disclosure, the $L_{10}$ life was 89 hours and the $L_{50}$ life was 152 hours. It was confirmed that the rolling fatigue life of the example of the present disclosure was twice or more as large as the rolling fatigue life of the comparative example. As with sample 1 and specimens 1 and 3, it is considered that the example of the present disclosure had a rolling fatigue life twice or more as large as that of the comparative example because the example of the present disclosure had a higher wear resistance and a higher toughness than those of the comparative example.

Bearing Part According to Second Embodiment

The following describes a configuration of a bearing part according to a second embodiment.

Figure 16:
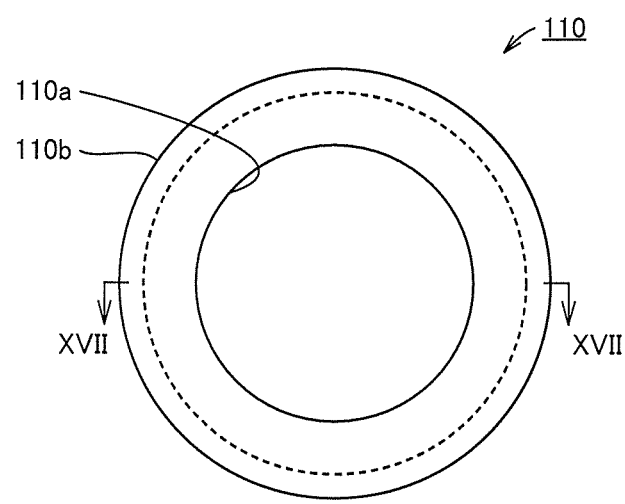
FIG. 16 is a top view of a bearing part according to a second embodiment.
Figure 17:
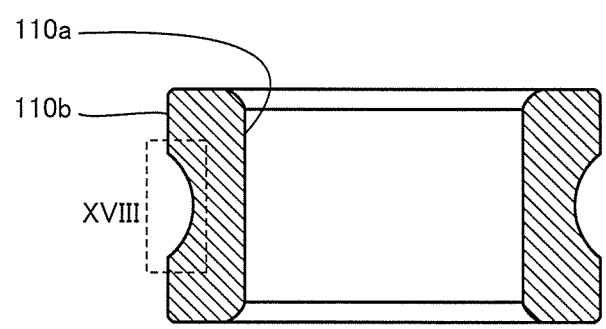
FIG. 17 is a cross sectional view along XVII-XVII of FIG. 16.

FIG. 16 is a top view of the bearing part according to the second embodiment. FIG. 17 is a cross sectional view along II-II of FIG. 16. As shown in FIG. 16 and FIG. 17, the bearing part according to the second embodiment is an inner ring 110 of a deep groove ball bearing, for example. The bearing part according to the second embodiment is not limited to this. The bearing part according to the second embodiment may be an outer ring of a deep groove ball bearing, or may be a rolling element of the deep groove ball bearing, for example.

Inner ring 110 is composed of a chromium molybdenum steel. The chromium molybdenum steel used for inner ring 110 is a steel belonging to a type of SCM steel defined in JIS (JIS G 4053: 2008), for example. The chromium molybdenum steel used for inner ring 110 may be SCM435 defined in JIS.

Inner ring 110 has surfaces. More specifically, inner ring 110 has an inner circumferential surface 110a and an outer circumferential surface 110b. Inner circumferential surface 110a is a surface at a side to which a shaft is attached. Outer circumferential surface 110b is a surface that constitutes a raceway surface of inner ring 110.

Figure 18:
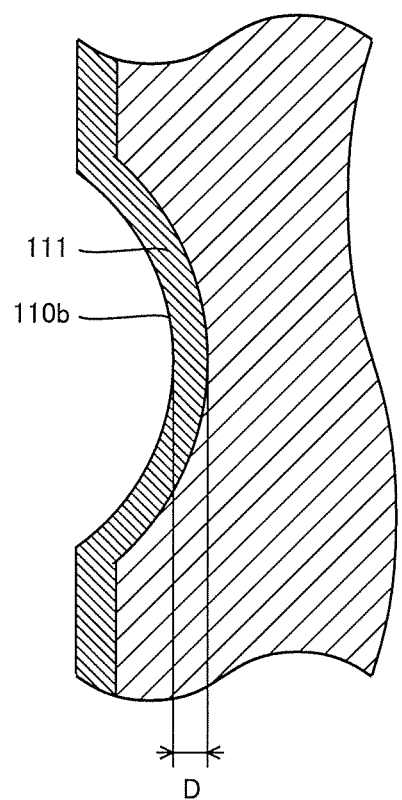
FIG. 18 is an enlarged view in a region XVIII of FIG. 17.

FIG. 18 is an enlarged view of a region III of FIG. 17. As shown in FIG. 18, inner ring 110 has a diffusion layer 111 in its surface (outer circumferential surface 110b). Diffusion layer 111 is a portion having nitrogen and carbon concentrations higher than the nitrogen and carbon concentrations in the chromium molybdenum steel of inner ring 110. Diffusion layer 111 has a depth D of more than or equal to 1 mm and less than or equal to 1.5 mm, for example.

Diffusion layer 111 contains a plurality of compound grains (precipitated compound) and a plurality of martensite blocks. Each of the compound grains is a crystal grain of an iron (Fe) carbide, an iron nitride, or an iron carbonitride. More specifically, the compound grain is a crystal grain of a compound in which chromium substitutes for part of an iron site of cementite ($Fe_3C$) and nitrogen (N) substitutes for part of a carbon (C) site thereof (i.e., a compound represented by $(Fe,Cr)_3(C,N)$).

The average grain size of the compound grains in diffusion layer 111 is less than or equal to 0.3 µm. The average grain size of the compound grains in diffusion layer 111 is preferably less than or equal to 0.25 µm. The area ratio of the compound grains in diffusion layer 111 is more than or equal to 3%. The area ratio of the compound grains in diffusion layer 111 is preferably more than or equal to 8%. The area ratio of the compound grains in diffusion layer 111 is less than or equal to 10%, for example.

It should be noted that the average grain size and area ratio of the compound grains in diffusion layer 111 are measured by the following method. First, a cross section of diffusion layer 111 is polished. Second, the polished surface is corroded. Third, a SEM (Scanning Electron Microscopy) image capturing is performed to the corroded polished surface (in the description below, an image obtained through the SEM image capturing will be referred to as "SEM image"). It should be noted that the SEM image is captured to include a sufficient number (more than or equal to 20) of compound grains. Fourth, image processing is performed to the obtained SEM image, thereby calculating the area of each compound grain and the total area of the compound grains in the SEM image.

The following relation is established between the equivalent circle diameter of the compound grain and the area of the compound grain: $\pi \times$(the equivalent circle diameter of the compound grain)$^2/4$=the area of the compound grain. Therefore, by calculating the square root of a value obtained by dividing the area of each compound grain in the SEM image by $4/\pi$, the equivalent circle diameter of each compound grain in the SEM image is calculated. The average grain size of the compound grains in diffusion layer 111 is represented by a value obtained by dividing the total of the equivalent circle diameters of the compound grains in the SEM image by the number of the compound grains in the SEM image. The area ratio of the compound grains in diffusion layer 111 is represented by a value obtained by dividing the total area of the compound grains in the SEM image by the area of the SEM image.

Each of the martensite blocks is a block of a martensite phase constituted of crystals with crystal orientations being aligned. The martensite phase is a non-equilibrium phase obtained by quenching an austenite phase of an iron having carbon dissolved therein in a solid state. When a deviation is more than or equal to 5° between the crystal orientation of a block of a first martensite phase and the crystal orientation of a block of a second martensite phase adjacent to the block of the first martensite phase, the block of the first martensite phase and the block of the second martensite phase are different martensite blocks. On the other hand, when the deviation is less than 5° between the crystal orientation of the block of the first martensite phase and the crystal orientation of the block of the second martensite phase adjacent to the block of the first martensite phase, the block of the first martensite phase and the block of the second martensite phase constitute one martensite block.

A maximum grain size of the martensite block in diffusion layer 111 is less than or equal to 3.8 µm. The maximum grain size of the martensite block in diffusion layer 111 is more than or equal to 3.6 µm, for example.

Martensite blocks included in diffusion layer 111 and having crystal grain sizes of less than or equal to 1 µm constitute a first group. The area ratio of the martensite blocks constituting the first group with respect to the total area of the martensite blocks included in diffusion layer 111 is preferably more than or equal to 0.55 and less than or equal to 0.75.

The martensite blocks included in diffusion layer 111 may be classified into a second group and a third group. The maximum value of the crystal grain sizes of the martensite blocks belonging to the second group is smaller than the minimum value of the crystal grain sizes of the martensite blocks belonging to the third group. A value obtained by dividing the total area of the martensite blocks belonging to the third group by the total area of the martensite blocks included in diffusion layer 111 is more than or equal to 0.5. A value obtained by dividing, by the total area of the martensite blocks included in diffusion layer 111, the total area of the martensite blocks belonging to the third group except for a martensite block that has the maximum crystal grain size and that belongs to the third group is less than 0.5.

From a different viewpoint, it is said that the martensite blocks included in the second group and the martensite blocks belonging to the third group are classified by the following method. That is, first, the martensite blocks are assigned to the first group sequentially from the one having the smallest crystal grain size, and the total area of the martensite blocks assigned to the second group with respect to the total area of the martensite blocks is sequentially calculated. Second, when the ratio of the total area of the martensite blocks assigned to the second group with respect to the total area of the martensite blocks reaches a limit of not more than 50%, the assignment of the martensite blocks to the second group is stopped. Third, martensite blocks not assigned to the second group are assigned to the third group.

Preferably, the average grain size of the martensite blocks included in the third group is more than or equal to 0.7 μm and less than or equal to 1.4 μm. Preferably, the average aspect ratio of the martensite blocks included in the third group is more than or equal to 2.5 and less than or equal to 2.8.

The martensite blocks included in diffusion layer 111 may be classified into a fourth group and a fifth group. The maximum value of the crystal grain sizes of the martensite blocks belonging to the fourth group is smaller than the minimum value of the crystal grain sizes of the martensite blocks belonging to the fifth group. A value obtained by dividing the total area of the martensite blocks belonging to the fifth group by the total area of the martensite blocks included in diffusion layer 111 is more than or equal to 0.7. A value obtained by dividing, by the total area of the martensite blocks included in diffusion layer 111, the total area of the martensite blocks belonging to the fifth group except for a martensite block that has the maximum crystal grain size and that belongs to the fifth group is less than 0.7.

From a different viewpoint, it is said that the martensite blocks included in the fourth group and the martensite blocks belonging to the fifth group are classified by the following method. That is, first, the martensite blocks are assigned to the fourth group sequentially from the one having the smallest crystal grain size, and the total area of the martensite blocks assigned to the fourth group with respect to the total area of the martensite blocks is sequentially calculated. Second, when the ratio of the total area of the martensite blocks assigned to the fourth group with respect to the total area of the martensite blocks reaches a limit of not more than 30%, the assignment of the martensite blocks to the fourth group is stopped. Third, martensite blocks not assigned to the fourth group are assigned to the fifth group.

Preferably, the average grain size of the martensite blocks included in the fifth group is more than or equal to 0.7 μm and less than or equal to 1.1 μm. Preferably, the average aspect ratio of the martensite blocks included in the fifth group is more than or equal to 2.4 and less than or equal to 2.6.

The crystal grain sizes of the martensite blocks in diffusion layer 111 and the aspect ratios of the martensite blocks are measured using an EBSD (Electron Backscattered Diffraction) method.

First, based on the EBSD method, a cross sectional image in diffusion layer 111 is captured (hereinafter, referred to as the "EBSD image"). It should be noted that the EBSD image is captured to include a sufficient number (more than or equal to 20) of the martensite blocks. Based on the EBSD image, a deviation of the crystal orientations of the blocks of the adjacent martensite phases is specified. Accordingly, a boundary of each martensite block is specified. Second, based on the boundary of the specified martensite block, the area and shape of each martensite block in the EBSD image are calculated.

More specifically, by calculating the square root of a value obtained by dividing the area of each martensite block in the EBSD image by 4/π, the equivalent circle diameter of each martensite block in the EBSD image is calculated. The largest value of the equivalent circle diameters of the martensite blocks in the EBSD image is regarded as the maximum grain size of the martensite blocks in diffusion layer 111.

Based on the equivalent circle diameter of each martensite block calculated as described above, the martensite blocks belonging to the first group among the martensite blocks in the EBSD image are determined. The value obtained by dividing, by the total area of the martensite blocks in the EBSD image, the total area of the martensite blocks belonging to the first group among the martensite blocks in the EBSD image is regarded as the value obtained by dividing the total area of the martensite blocks belonging to the first group in diffusion layer 111 by the total area of the martensite blocks in diffusion layer 111.

Based on the equivalent circle diameter of each martensite block calculated as described above, the martensite blocks in the EBSD image are classified into the second group and the third group (or classified into the fourth group and the fifth group). The value obtained by dividing, by the number of the martensite blocks classified into the third group (or the fifth group) in the EBSD image, the total of the equivalent circle diameters of the martensite blocks classified into the third group (or the fifth group) in the EBSD image is regarded as the average grain size of the martensite blocks belonging to the third group (or belonging to the fifth group) in diffusion layer 111.

From the shape of each martensite block in the EBSD image, the shape of each martensite block in the EBSD image is approximated to an ellipse by the least squares method. This approximation to an ellipse by the least squares method is performed in accordance with a method described in S. Biggin and D. J. Dingley, Journal of Applied Crystallography, (1977) 10, 376-378. By dividing the size in the major axis by the size in the minor axis in this elliptical shape, the aspect ratio of each martensite block in the EBSD method image is calculated. A value obtained by dividing the total of the aspect ratios of the martensite blocks classified into the third group (or the fifth group) in the EBSD image by the number of the martensite blocks classified into the third group (or the fifth group) in the EBSD image is regarded as the average aspect ratio of the martensite blocks belonging to the third group (or belonging to the fifth group) in diffusion layer 111.

The plurality of prior austenite grains are included in diffusion layer 111. It should be noted that each of the prior austenite grains is a region defined by a crystal grain boundary (prior austenite grain boundary) of austenite grains formed in a holding step S41 and a holding step S51. The average grain size of the prior austenite grains is preferably less than or equal to 8 μm. The average grain size of the prior austenite grains is more preferably less than or equal to 6 μm.

It should be noted that the average grain size of the prior austenite grains in diffusion layer 111 is measured by the following method. First, a cross section of diffusion layer 111 is polished. Second, the polished surface is corroded. Third, an optical microscope image capturing is performed to the corroded polished surface (in the description below, an image obtained by the optical microscope image capturing will be referred to as "optical microscope image"). It should be noted that the optical microscope image is captured to include a sufficient number (more than or equal to 20) of prior austenite grains. Fourth, image processing is performed to the obtained optical microscope image, thereby calculating the area of each prior austenite grain in the optical microscope image.

By calculating the square root of a value obtained by dividing the area of each prior austenite grain in the optical microscope image by $4/\pi$, the equivalent circle diameter of each prior austenite grain in the optical microscope image is calculated. The average grain size of the prior austenite grains in diffusion layer 111 is represented by a value obtained by dividing the total of the equivalent circle diameters of the prior austenite grains in the optical microscope image by the number of the prior austenite grains in the optical microscope image.

An average carbon concentration in diffusion layer 111 between the surface (outer circumferential surface 110b) of inner ring 110 and a position distant away by 10 μm from the surface of inner ring 110 is preferably more than or equal to 0.7 mass %. The average carbon concentration in diffusion layer 111 between the surface (outer circumferential surface 110b) of inner ring 110 and the position distant away by 10 μm from the surface of inner ring 110 is preferably less than or equal to 1.2 mass %.

An average nitrogen concentration in diffusion layer 111 between the surface (outer circumferential surface 110b) of inner ring 110 and the position distant away by 10 μm from the surface of inner ring 110 is preferably more than or equal to 0.2 mass %. The average nitrogen concentration in diffusion layer 111 between the surface (outer circumferential surface 110b) of inner ring 110 and the position distant away by 10 μm from the surface of inner ring 110 is preferably less than or equal to 0.4 mass %.

The average carbon concentration and average nitrogen concentration in diffusion layer 111 between the surface (outer circumferential surface 110b) of inner ring 110 and the position distant away by 10 μm from the surface of inner ring 110 are measured using the EPMA (Electron Probe Micro Analyzer).

Method for Manufacturing Bearing Part According to Second Embodiment

The following describes a method for manufacturing the bearing part according to the second embodiment.

Figure 19:
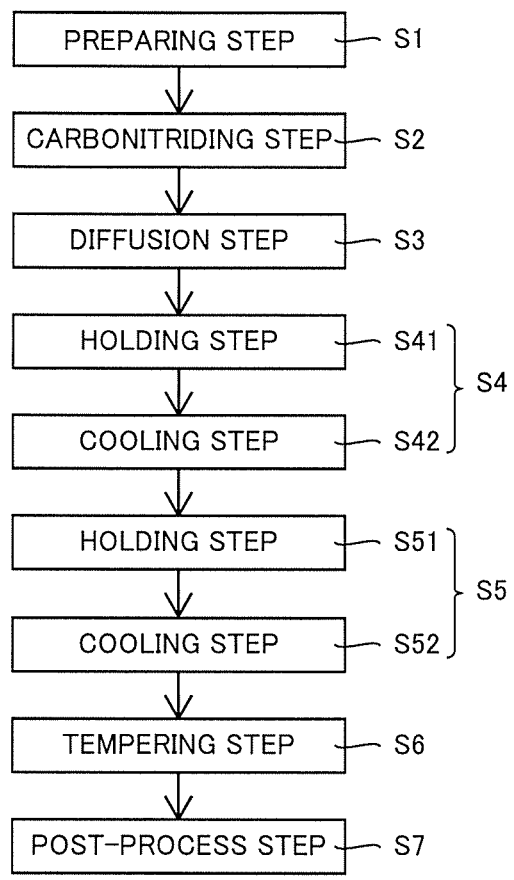
FIG. 19 is a flowchart showing a method for manufacturing the bearing part according to the second embodiment.

FIG. 19 is a flowchart showing the method for manufacturing the bearing part according to the second embodiment. As shown in FIG. 19, the method for manufacturing the bearing part according to the second embodiment includes a preparing step S1, a carbonitriding step S2, a diffusion step S3, a primary quenching step S4, a secondary quenching step S5, a tempering step S6, and a post-process step S7.

In preparing step S1, there is prepared a processing target member to be processed into inner ring 110 through carbonitriding step S2, diffusion step S3, primary quenching step S4, secondary quenching step S5, tempering step S6, and post-process step S7. The processing target member is composed of a chromium molybdenum steel, such as one of a SCM steel type defined in JIS.

In carbonitriding step S2, a surface of the processing target member is carbonitrided. Carbonitriding step S2 is performed by holding the processing target member in a furnace at a predetermined temperature (hereinafter, referred to as "first holding temperature") for a predetermined time (hereinafter, referred to as "first holding time"). For the furnace atmosphere, a gas containing an endothermic converted gas (R gas) and ammonia ($NH_3$) is used, for example. The first holding temperature is more than or equal to 930° C. and less than or equal to 940° C., for example. The first holding time is more than or equal to 10 hours and less than or equal to 15 hours, for example.

In diffusion step S3, the carbon and nitrogen introduced via the surface of the processing target member in carbonitriding step S2 are diffused to the inside of the processing target member. Diffusion step S3 is performed by holding the processing target member at a predetermined temperature (hereinafter, referred to as "second holding temperature") for a predetermined time (hereinafter, referred to as "second holding time") in the furnace. For the furnace atmosphere, a gas containing an endothermic converted gas (R gas) and ammonia ($NH_3$) is used, for example. The second holding temperature is more than or equal to 930° C. and less than or equal to 940° C., for example. The second holding time is more than or equal to 5 hours and less than or equal to 10 hours, for example.

In diffusion step S3, α defined by the above-described formulas (1) and (2) is adjusted to be lower than that in carbonitriding step S2. As apparent from the above-described formulas (1) and (2), the adjustment of α is performed by adjusting an amount of carbon monoxide, an amount of carbon dioxide, and an amount of undecomposed ammonia in the atmosphere. It should be noted that the amount of the undecomposed ammonia in the atmosphere is preferably more than or equal to 0.1 volume %.

In primary quenching step S4, the processing target member is quenched. Primary quenching step S4 includes a holding step S41 and a cooling step S42. Holding step S41 is performed by holding the processing target member in the furnace at a predetermined temperature (hereinafter, referred to as "third holding temperature") for a predetermined time (hereinafter, referred to as "second holding time"). It should be noted that in primary quenching step S4, no ammonia is included in the atmosphere of the furnace. The third holding temperature is a temperature of more than or equal to the $A_1$ transformation point of the steel and less than the first holding temperature and the second holding temperature. The third holding temperature is more than or equal to 850° C. and less than 930° C., for example. Preferably, the third holding temperature is more than or equal to 860° C. and less than or equal to 880° C. The third holding time is more than or equal to 0.5 hour and less than or equal to 2 hours, for example. In cooling step S42, the processing target member is cooled. Cooling step S42 is performed by oil cooling, for example.

In secondary quenching step S5, the processing target member is quenched. Secondary quenching step S5 includes a holding step S51 and a cooling step S52. Holding step S51 is performed by holding the processing target member in a furnace at a predetermined temperature (hereinafter, referred to as "fourth holding temperature") for a predetermined time (hereinafter, referred to as "fourth holding time"). It should be noted that in secondary quenching step S5, no ammonia is included in the atmosphere in the furnace. The fourth holding temperature is a temperature of more than or equal to the A1 transformation point of the steel of the processing target member and less than the third holding temperature. The fourth holding temperature is more than or equal to the $A_1$ transformation point of the steel of the processing target member, and is less than or equal to 850° C., for example. The fourth holding temperature is preferably more than or equal to 820° C. and less than or equal to 840° C. The fourth holding time is more than or equal to 1 hour and less than or equal to 2 hours, for example. In cooling step S52, the processing target member is cooled. Cooling step S52 is performed by oil cooling, for example.

The compound grains in diffusion layer 111 are precipitated mainly in holding step S41 and holding step S51. The limit of solid solution of each of carbon and nitrogen in the steel is increased as the holding temperature becomes higher (the limit of solid solution of each of carbon and nitrogen in the steel is decreased as the holding temperature becomes lower). In order to avoid the compound grains from being precipitated to be too large in diffusion layer 111 in holding step S41, the third holding temperature is set to be higher than the holding temperature in general quenching (the third holding temperature is set to relatively increase the limit of solid solution of each of carbon and nitrogen in the steel as compared with that in the general quenching).

In holding step S51, the compound grains have been already precipitated in holding step S41. That is, in holding step S51, the carbon concentration and nitrogen concentration in the base material have been decreased, and the compound grains are less likely to be precipitated than in holding step S41. Hence, in order to promote precipitation of the compound grains in holding step S51 by decreasing the limit of solid solution of each of nitrogen and carbon in the steel, the fourth holding temperature is set to be lower than the third holding temperature. Accordingly, the area ratio of the compound grains in diffusion layer 111 can be more than or equal to 3%. Moreover, by setting the fourth holding temperature to be lower than the third holding temperature, the compound grains precipitated in holding step S41 and holding step S51 can be suppressed from being coarse, whereby the average grain size of the compound grains in diffusion layer 111 can be less than or equal to 0.3 μm.

In each of holding step S41 and holding step S51, through a pinning effect of the large amount of the fine compound grains precipitated as described above, growth of the austenite grains is suppressed, whereby the austenite crystal grains are kept to be fine. Regarding the martensite transformation, a plurality of martensite blocks are formed in one austenite crystal grain. From another viewpoint, it is said that one martensite block is not formed across a plurality of austenite crystal grains. Accordingly, as an austenite crystal grain becomes finer, a martensite block included therein also becomes finer.

In tempering step S6, the processing target member is tempered. Tempering step S6 is performed by performing cooling after holding the processing target member in a furnace at a predetermined temperature (hereinafter, referred to as "fifth holding temperature") for a predetermined time (hereinafter, referred to as "fifth holding time"). The fifth holding temperature is a temperature of less than or equal to the $A_1$ transformation point of the steel of the processing target member. The fifth holding temperature is more than or equal to 150° C. and less than or equal to 350° C., for example. The fourth holding time is 0.5 hour to 5 hours, for example. The cooling in tempering step S6 is performed by air cooling, for example.

Figure 20:
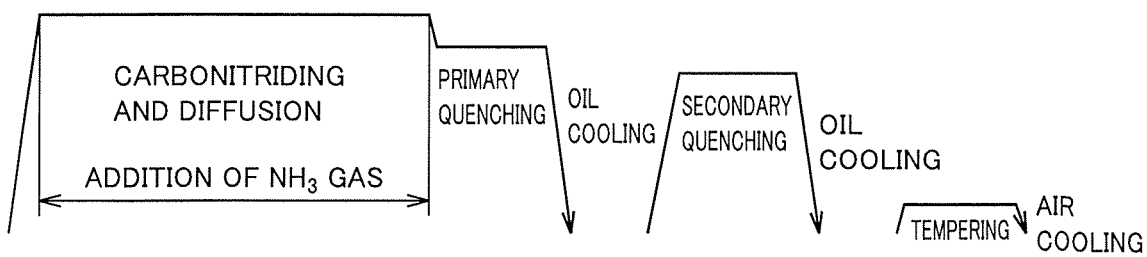
FIG. 20 is a graph showing a heat pattern in the method for manufacturing the bearing part according to the second embodiment.

FIG. 20 is a graph showing a heat pattern in the method for manufacturing the bearing part according to the second embodiment. FIG. 20 schematically shows a relation among the first holding temperature to the fifth holding temperature and the first holding time to the fifth holding time.

In post-process step S7, the processing target member is post-processed. In post-process step S7, cleaning of the processing target member, machining of the processing target member, such as grinding or polishing, and the like are performed, for example. In the manner described above, the bearing part according to the second embodiment is manufactured.

Configuration of Rolling Bearing According to Second Embodiment

The following describes a configuration of rolling bearing 100 according to the second embodiment.

Figure 21:
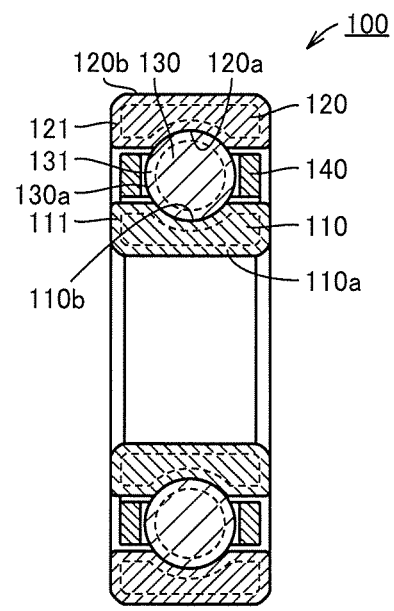
FIG. 21 is a cross sectional view of a rolling bearing 100 according to the second embodiment.

FIG. 21 is a cross sectional view of a rolling bearing 100 according to the second embodiment. As shown in FIG. 21, rolling bearing 100 is a deep groove ball bearing, for example. However, rolling bearing 100 according to the second embodiment is not limited to this. Rolling bearing 100 according to the second embodiment may be a tapered roller bearing, for example. Rolling bearing 100 according to the second embodiment has inner ring 110, an outer ring 120, rolling elements 130, and a cage 140. The configuration of inner ring 110 is as described above.

Outer ring 120 is composed of a chromium molybdenum steel. A SCM steel type defined in JIS is used for outer ring 120, for example. The chromium molybdenum steel used for outer ring 120 is SCM435 defined in JIS, for example. Outer ring 120 has an inner circumferential surface 120a and an outer circumferential surface 120b. Inner circumferential surface 120a constitutes a raceway surface of outer ring 120. Inner ring 110 and outer ring 120 are disposed such that outer circumferential surface 110b and inner circumferential surface 120a face each other. A diffusion layer 121 is provided in the surface (inner circumferential surface 120a) of outer ring 120. Diffusion layer 121 has the same configuration as that of diffusion layer 111.

Each of rolling elements 130 is composed of a chromium molybdenum steel. A SCM steel type defined in JIS is used for rolling element 130, for example. The chromium molybdenum steel used for rolling element 130 is SCM435 defined in JIS, for example. Rolling element 130 is disposed to be rollable between outer circumferential surface 110b and inner circumferential surface 120a. Rolling element 130 has a spherical shape.

Rolling element 130 has a surface 130a. Surface 130a constitutes a rolling contact surface of rolling element 130. A diffusion layer 31 is provided in surface 130a of rolling element 130. Diffusion layer 31 has the same configuration as that of diffusion layer 111.

It should be noted that the diffusion layer does not need to be provided in each of outer circumferential surface 110b, inner circumferential surface 120a, and surface 130a. The diffusion layer may be provided in at least one of outer circumferential surface 110b, inner circumferential surface 120a, and surface 130a.

Cage 140 is composed of a resin material, for example. Cage 140 has a ring-like shape. Cage 140 is disposed between inner ring 110 and outer ring 120. Cage 140 is provided with a plurality of through holes. The through holes extend through cage 140 in a direction from the inner circumferential surface toward the outer circumferential surface. The through holes are disposed at an equal interval in the circumferential direction of cage 140. Rolling elements 130 are disposed in the through holes. Accordingly, a space between adjacent rolling elements 130 in the circumferential direction is maintained.

Effects of Bearing Part According to Second Embodiment and Rolling Bearing According to Second Embodiment The following describes effects of the bearing part according to the second embodiment and rolling bearing 100 according to the second embodiment.

The bearing part according to the second embodiment is composed of a chromium molybdenum steel. Accordingly, in the bearing part according to the second embodiment, the content of an alloy element is relatively low, thereby suppressing increase in cost of the steel material and increase in process cost.

Since the average grain size of the compound grains in diffusion layer 111 is less than or equal to 0.3 μm and the area ratio of the compound grains in diffusion layer 111 is more than or equal to 3%, the large amount of the relatively fine compound grains are dispersed in diffusion layer 111. Accordingly, due to the pinning effect of the compound grains, the prior austenite grains in diffusion layer 111 become fine, with the result that the martensite blocks in diffusion layer 111 also become fine. As a larger amount of the fine compound grains each having a relatively high hardness are dispersed and as the crystal grain sizes of the martensite blocks becomes finer, the hardness and toughness of diffusion layer 111 are more improved. Therefore, according to the bearing part according to the second embodiment, the wear resistance and toughness of the bearing part can be secured while suppressing increase in cost of the steel material and increase in process cost, which would have been otherwise resulted from the increased content of the alloy element.

When the value obtained by dividing the total area of the martensite block belonging to the first group by the total area of the martensite blocks is more than or equal to 0.55 and less than or equal to 0.75 in diffusion layer 111, the ratio of the fine martensite blocks each having a crystal grain size of less than or equal to 1.0 μm in diffusion layer 111 becomes relatively high. Accordingly, in this case, the wear resistance and toughness of the bearing part can be further improved.

When the average grain size of the martensite blocks belonging to the third group is more than or equal to 0.7 μm and less than or equal to 1.4 μm in diffusion layer 111, the ratio of the fine martensite blocks in diffusion layer 111 becomes relatively high. Accordingly, in this case, the wear resistance and toughness of the bearing part can be further improved. As each martensite block has a smaller aspect ratio (as the aspect ratio is closer to 1), the martensite block is less likely to be a source of stress concentration. Accordingly, when the average aspect ratio of the martensite blocks belonging to the third group in diffusion layer 111 is more than or equal to 2.5 and less than or equal to 2.8, the toughness of the bearing part can be further improved.

When the average grain size of the martensite blocks belonging to the fifth group is more than or equal to 0.6 μm and less than or equal to 1.1 μm in diffusion layer 111, the ratio of the fine martensite blocks in diffusion layer 111 becomes relatively high. Accordingly, in this case, the wear resistance and toughness of the bearing part can be further improved. When the average aspect ratio of the martensite blocks belonging to the fifth group in diffusion layer 111 is more than or equal to 2.4 and less than or equal to 2.6, the toughness of the bearing part can be further improved.

A plurality of martensite blocks are generated from one austenite grain, and one martensite block is not formed across a plurality of austenite grains. Accordingly, as the crystal grain size of the prior austenite grain becomes smaller, the crystal grain size of the martensite block formed in the grain becomes smaller. Therefore, when the average grain size of the prior austenite grains in diffusion layer 111 is less than or equal to 8 μm, the grain sizes of the martensite blocks in diffusion layer 111 can be finer, whereby the wear resistance and toughness of the bearing part can be further improved.

In rolling bearing 100 according to the second embodiment, at least one of outer circumferential surface 110b, inner circumferential surface 120a, and surface 130a is provided with a diffusion layer having the same configuration as that of diffusion layer 111. Therefore, according to rolling bearing 100 according to the second embodiment, the wear resistance and toughness of the rolling bearing can be secured while suppressing increase in cost of the steel material and increase in process cost, which would have been otherwise resulted from the increased content of the alloy element.

Example 2

The following describes an experiment (hereinafter, referred to as "the present experiment") performed to confirm the effects of the bearing part according to the second embodiment and rolling bearing 100 according to the second embodiment.

<Samples>

A sample 5 to a sample 8 were used in the present experiment. A steel used for each of sample 5 to sample 8 is SCM435 as shown in Table 1. Each of sample 5 and sample 7 is an inner ring of a tapered roller bearing, whereas each of sample 6 and sample 8 is a tapered roller of a tapered roller bearing.

TABLE 1

| C (w %) | Si (wt %) | Mn (wt %) | P (wt %) | S (wt %) | Ni (wt %) | Cr (wt %) | Mo (wt %) | Fe (wt %) |
|---|---|---|---|---|---|---|---|---|
| 0.33 to 0.38 | 0.15 to 0.35 | 0.60 to 0.90 | Less Than or Equal to 0.030 | Less Than or Equal to 0.030 | Less Than or Equal to 0.25 | 0.90 to 1.20 | 0.15 to 0.30 | Remainder |

As shown in Table 2, each of sample 5 to sample 8 was subjected to carbonitriding step S2 under conditions that the first holding temperature was more than or equal to 930° C. and less than or equal to 940° C. and the first holding time was 13 hours. Each of sample 5 to sample 8 was subjected to diffusion step S3 under conditions that the second holding temperature was more than or equal to 930° C. and less than or equal to 940° C. and the second holding time was 6 hours. It should be noted that an amount of carbon monoxide, an amount of carbon dioxide, and an amount of ammonia in the atmosphere in each of carbonitriding step S2 and diffusion step S3 were respectively more than or equal to 11 volume % and less than or equal to 17 volume %, more than or equal to 0.05 volume % and less than or equal to 0.15 volume %, and more than or equal to 0.1 volume % and less than or equal to 0.3 volume %.

Each of sample 5 to sample 8 was subjected to primary quenching step S4 under conditions that the third holding temperature step S4 was 870° C. and the third holding time was 1 hour. Each of sample 5 and sample 6 was subjected to secondary quenching step S5 under conditions that the fourth holding temperature was 830° C. and the fourth holding time was 1.5 hours. Moreover, each of sample 5 to sample 8 was subjected to tempering step S6 under conditions that the fifth holding temperature was 180° C. and the fifth holding time was 3 hours. Each of sample 5 to sample 8 was subjected to mechanical polishing with a polishing amount of 150 μm as post-process step S7.

TABLE 2

|  | Sample 1, Sample 2 | Sample 3, Sample 4 |
|---|---|---|
| First Holding Temperature (° C.) | 930 to 940 | 930 to 940 |
| First Holding Time (h) | 13 | 13 |
| Second Holding Temperature (° C.) | 930 to 940 | 930 to 940 |
| Second Holding Time (h) | 6 | 6 |
| Third Holding Temperature (° C.) | 870 | 870 |
| Third Holding Time (h) | 1 | 1 |
| Fourth Holding Temperature (° C.) | 830 | — |
| Fourth Holding Time (h) | 1.5 | — |
| Fifth Holding Temperature (° C.) | 180 | 180 |
| Fifth Holding Time (h) | 3 | 3 |

<Measurement of Carbon Concentration and Nitrogen Concentration>

Figure 22:
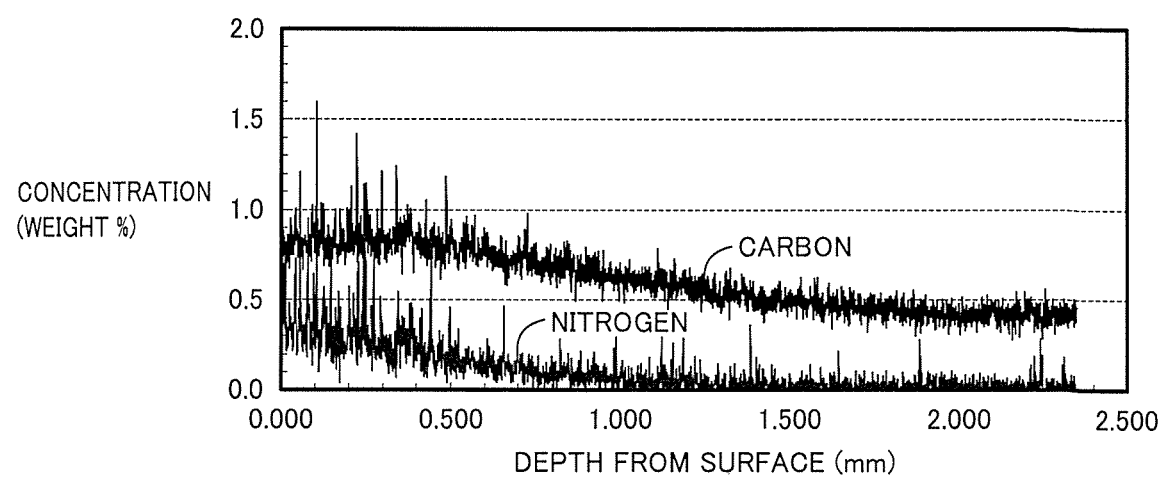
FIG. 22 is a graph showing a result of measurement of each of a carbon concentration and a nitrogen concentration by EPMA in a sample 5.
Figure 23:
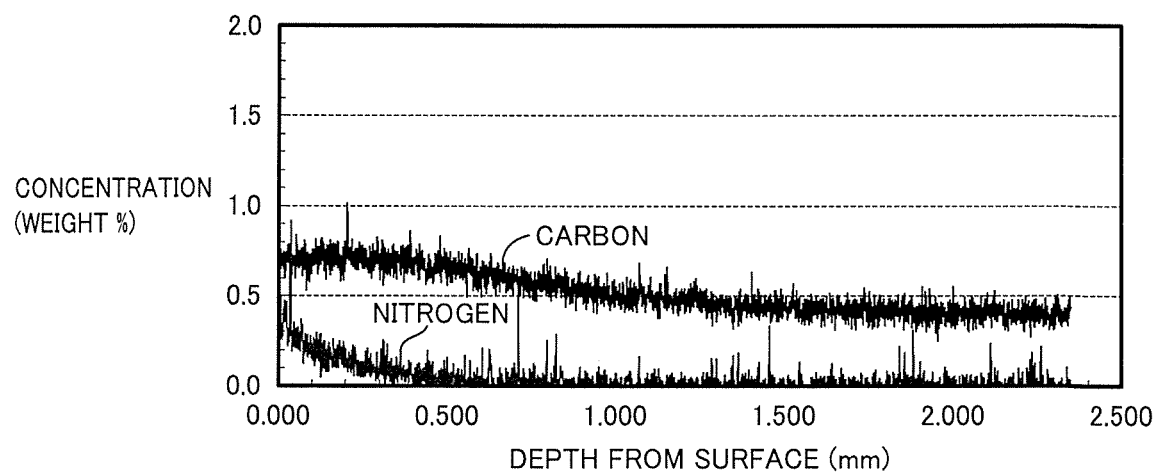
FIG. 23 is a graph showing a result of measurement of each of a carbon concentration and a nitrogen concentration by EPMA in a sample 7.

FIG. 22 is a graph showing a result of measurement of carbon concentration and nitrogen concentration by EPMA in sample 5. FIG. 23 is a graph showing a result of measurement of each of carbon and nitrogen concentrations by EPMA in sample 7. It should be noted that in each of FIG. 22 and FIG. 23, the horizontal axis represents a distance (unit: mm) from the surface of each of sample 5 and sample 7, whereas the vertical axis represents the carbon concentration and the nitrogen concentration (unit: mass % concentration).

As shown in FIG. 22, in the vicinity of the surface of sample 5, a multiplicity of sharp peaks were confirmed in the carbon concentration and the nitrogen concentration. From this result, it was experimentally confirmed that fine compound grains, such as a carbide, a nitride, and a carbonitride, were precipitated in the vicinity of the surface in sample 5. Moreover, in sample 5, the average carbon concentration in the region between the surface and the position distant away by 10 μm from the surface fell within a range of more than or equal to 0.7% and less than or equal to 1.2%, and the average nitrogen concentration in this region fell within a range of more than or equal to 0.2 mass % and less than or equal to 0.4 mass %. On the other hand, as shown in FIG. 23, in the vicinity of the surface of sample 6, a multiplicity of sharp peaks were not confirmed in the carbon concentration and the nitrogen concentration. From this result, it was experimentally confirmed that no fine compound grains, such as a carbide, a nitride, and a carbonitride, were precipitated in the vicinity of the surface in sample 7.

<Structure Observation>

Figure 24:
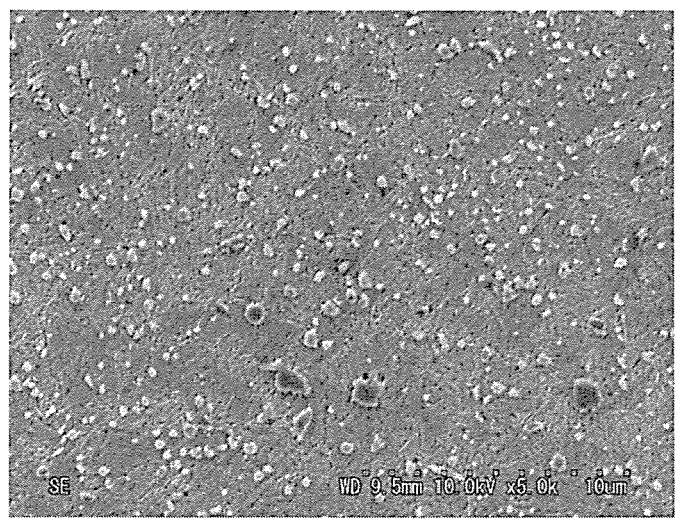
FIG. 24 is an electron microscope image of a vicinity of a surface of sample 5.
Figure 25:
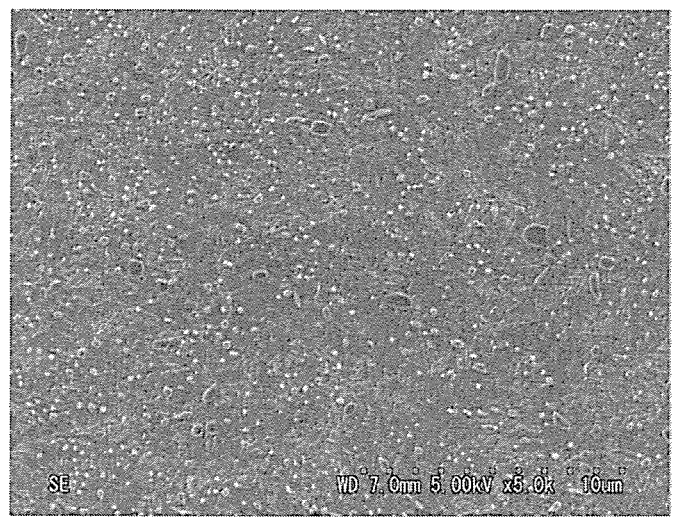
FIG. 25 is an electron microscope image of a vicinity of a surface of sample 6.

FIG. 24 is an electron microscope image of the vicinity of the surface of sample 5. FIG. 25 is an electron microscope image of the vicinity of the surface of sample 6. As shown in FIG. 24 and FIG. 25, in the vicinity of the surfaces of sample 5 and sample 6, it was confirmed that a multiplicity of compound grains of more than or equal to 0.2 μm and less than or equal to 3.0 μm were precipitated. Moreover, in the vicinity of the surface of each of sample 5 and sample 6, it was confirmed that the average grain size of the compound grains was about 0.25 μm. Further, in the vicinity of the surface of each of sample 5 and sample 6, it was confirmed that the area ratio of the compound grains was about 8%.

Figure 26:
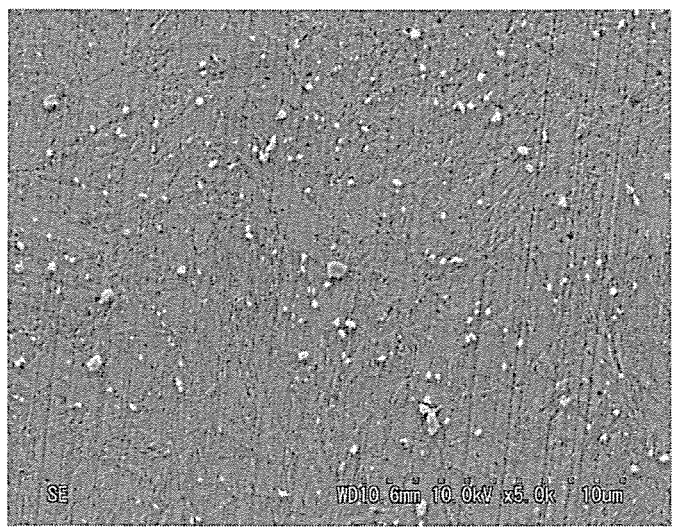
FIG. 26 is an electron microscope image of a vicinity of a surface of sample 7.
Figure 27:
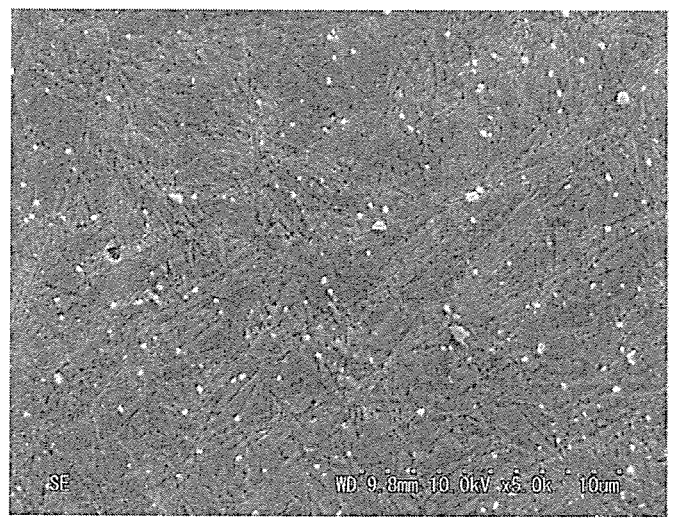
FIG. 27 is an electron microscope image of a vicinity of a surface of sample 8.

FIG. 26 is an electron microscope image of the vicinity of the surface of sample 7. FIG. 27 is an electron microscope image of the vicinity of the surface of sample 8. As shown in FIG. 26 and FIG. 27, in the vicinity of the surface of each of sample 7 and sample 8, it was confirmed that the area ratio of the compound grains was about 1%.

Figure 28:
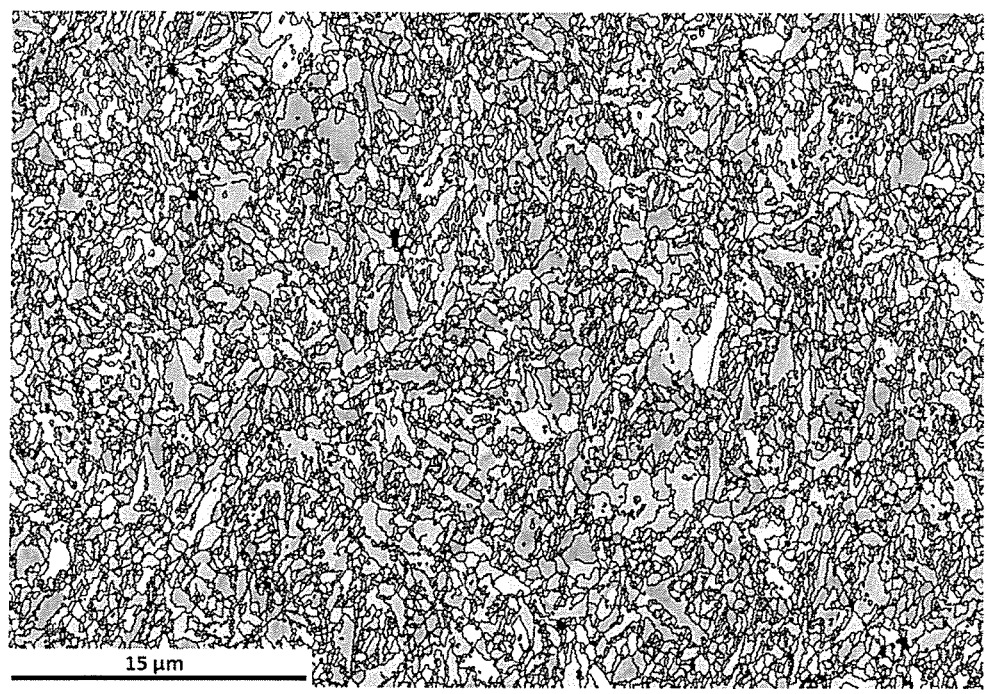
FIG. 28 is an EBSD image of the vicinity of the surface of sample 6.

FIG. 28 is an EBSD image of the vicinity of the surface of sample 6. As shown in FIG. 28, in the vicinity of the surface of sample 6, it was confirmed that the maximum grain size of the martensite blocks fell within the range of more than or equal to 3.6 μm and less than or equal to 3.8 μm. Moreover, in the vicinity of the surface of sample 6, it was confirmed that martensite blocks each having a crystal grain size of less than or equal to 2 μm occupied more than or equal to 90% of the area of the martensite blocks. Further, in the vicinity of the surface of sample 6, it was confirmed that martensite blocks each having a crystal grain size of less than or equal to 1 μm occupied more than or equal to 55% and less than or equal to 75% of the area of the martensite blocks.

Figure 29:
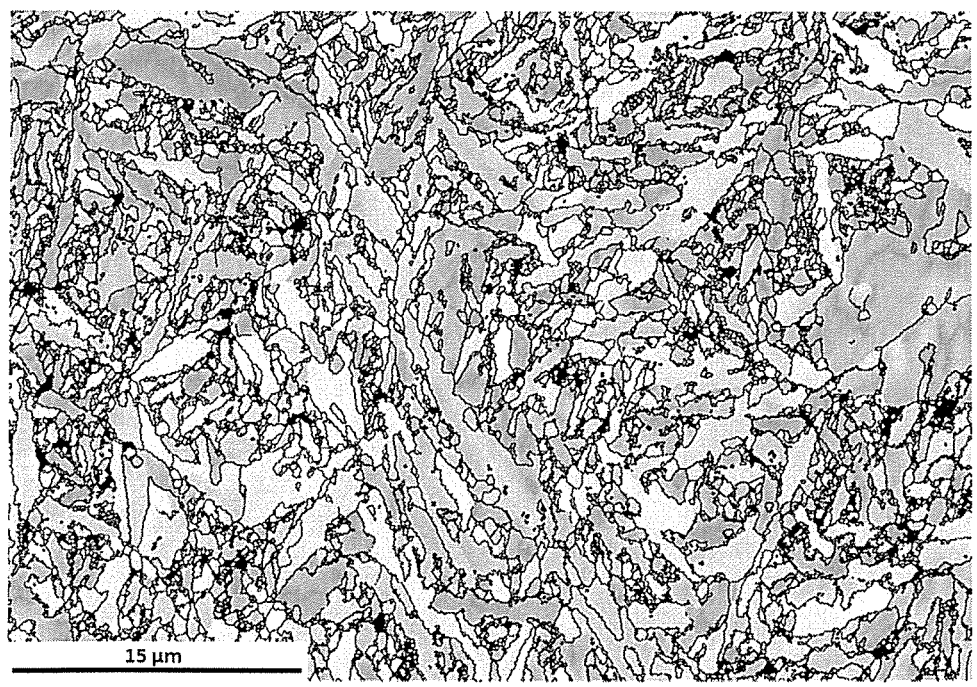
FIG. 29 is an EBSD image of the vicinity of the surface of sample 8.

FIG. 29 is an EBSD image of the vicinity of the surface of sample 8. As shown in FIG. 29, in the vicinity of the surface of sample 8, it was confirmed that the maximum grain size of the martensite blocks fell within the range of more than or equal to 5.1 μm and less than or equal to 7.3 μm. Moreover, in the vicinity of the surface of sample 8, it was confirmed that martensite blocks each having a crystal grain size of less than or equal to 2 μm occupied more than or equal to 65% and less than or equal to 80% of the area of the martensite blocks. Further, in the vicinity of the surface of sample 8, it was confirmed that martensite blocks each having a crystal grain size of less than or equal to 1 μm occupied more than or equal to 35% and less than or equal to 45% of the area of the martensite blocks.

Figure 30:
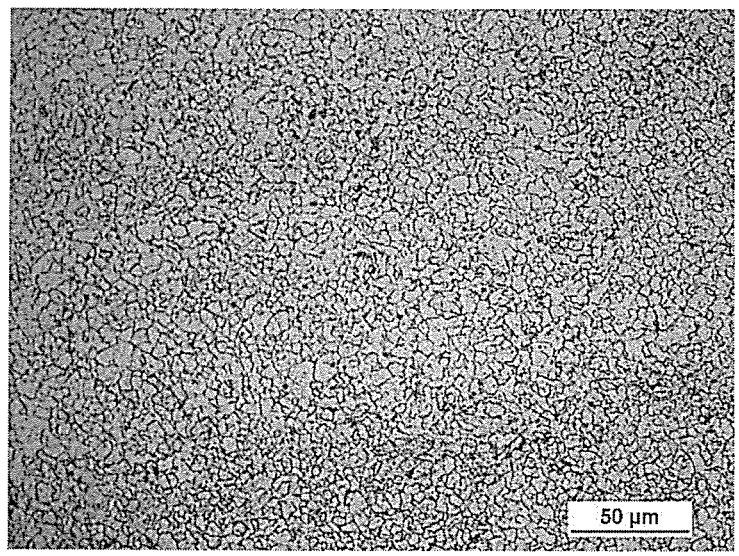
FIG. 30 is an optical microscope image of the vicinity of the surface of sample 5.
Figure 31:
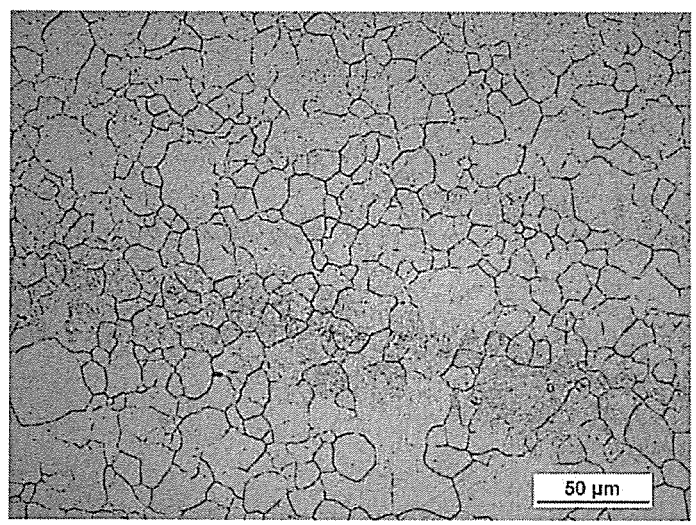
FIG. 31 is an optical microscope image of the vicinity of the surface of sample 7.

FIG. 30 is an optical microscope image of the vicinity of the surface of sample 5. As shown in FIG. 30, in the vicinity of the surface of sample 5, it was confirmed that the average grain size of the prior austenite grains fell within a range of more than or equal to 4 μm and less than or equal to 8 μm, and the crystal grain sizes of the prior austenite grains were distributed in the range of more than or equal to 1 μm and less than or equal to 10 μm. FIG. 31 is an optical microscope image of the vicinity of the surface of sample 7. As shown in FIG. 31, in the vicinity of the surface of sample 7, it was confirmed that the average grain size of the prior austenite grains fell within a range of more than or equal to 12 μm and less than or equal to 25 μm, and the crystal grain sizes of the prior austenite grains were distributed in a wide range of more than or equal to 5 μm and less than or equal to 100 μm.

Figure 32:
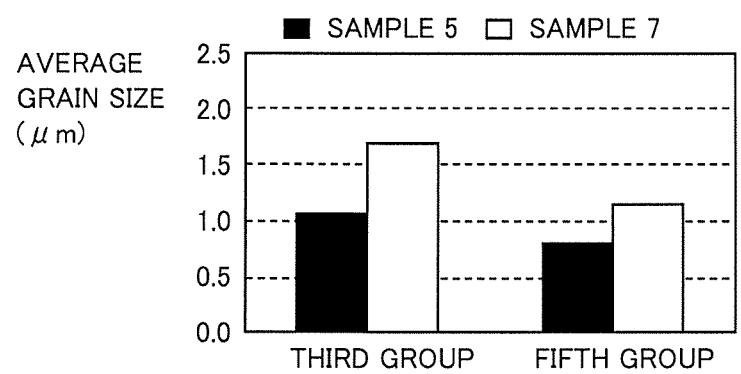
FIG. 32 is a graph showing average grain sizes of martensite blocks belonging to a third group and a fifth group in the vicinity of the surface of each of sample 5 and sample 7.
Figure 33:
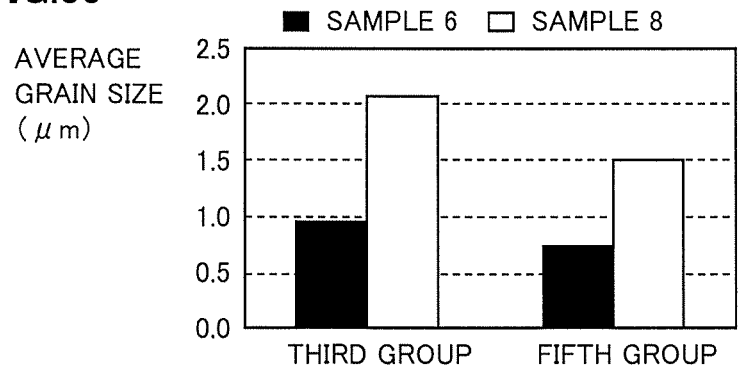
FIG. 33 is a graph showing average grain sizes of martensite blocks belonging to the third group and the fifth group in the vicinity of the surface of each of sample 6 and sample 8.

FIG. 32 is a graph showing the average grain size of the martensite blocks belonging to each of the third group and the fifth group in the vicinity of the surface of each of sample 5 and sample 7. It should be noted that in FIG. 32, the vertical axis represents the average grain size (unit: μm). FIG. 33 is a graph showing an average grain size of martensite blocks belonging to each of the third group and the fifth group in the vicinity of the surface of each of sample 6 and sample 8. It should be noted that in FIG. 33, the vertical axis represents the average grain size (unit: μm).

As shown in FIG. 32, in the vicinity of the surface of sample 5, the average grain size of the martensite blocks belonging to the third group was about 1.0 μm. As shown in FIG. 33, in the vicinity of the surface of sample 6, the average grain size of the martensite blocks belonging to the third group was about 0.9 μm. From this, in each of sample 5 and sample 6, it was confirmed that the average grain size of the martensite blocks belonging to the third group fell within a range of more than or equal to 0.7 μm and less than or equal to 1.4 μm.

As shown in FIG. 32, in the vicinity of the surface of sample 5, the average grain size of the martensite blocks belonging to the fifth group was about 0.8 μm. As shown in FIG. 33, in the vicinity of the surface of sample 6, the average grain size of the martensite blocks belonging to the fifth group was about 0.7 μm. From this, in each of sample 5 and sample 6, it was confirmed that the average grain size of the martensite blocks belonging to the fifth group fell within a range of more than or equal to 0.6 μm and less than or equal to 1.1 μm.

On the other hand, in the vicinities of the surfaces of sample 7 and sample 8, the average grain sizes of the martensite blocks belonging to the third group were respectively about 1.7 μm and about 2.2 μm. Moreover, in the vicinities of the surfaces of sample 7 and sample 8, the average grain sizes of the martensite blocks belonging to the fifth group were respectively about 1.3 μm and about 1.5 μm.

Figure 34:
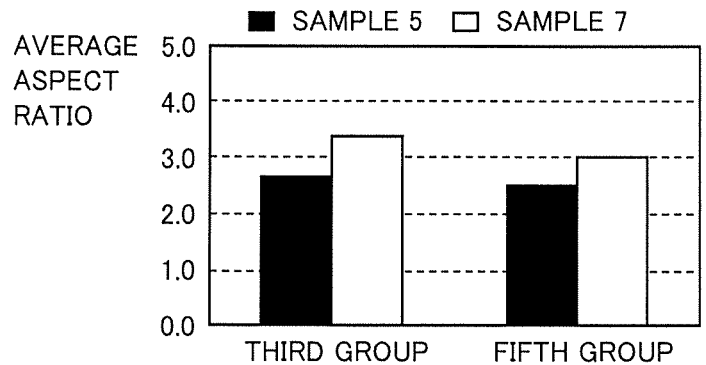
FIG. 34 is a graph showing average aspect ratios of the martensite blocks belonging to the third group and the fifth group in the vicinity of the surface of each of sample 5 and sample 7.
Figure 35:
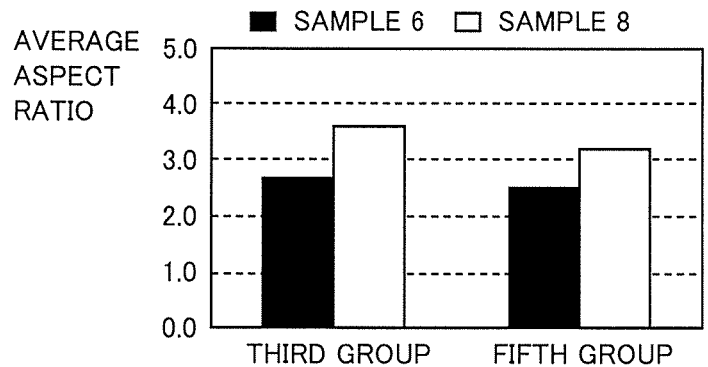
FIG. 35 is a graph showing average aspect ratios of the martensite blocks belonging to the third group and the fifth group in the vicinity of the surface of each of sample 6 and sample 8.

FIG. 34 is a graph showing an average aspect ratio of martensite blocks belonging to the third group and the fifth group in the vicinity of the surface of each of sample 5 and sample 7. It should be noted that in FIG. 34, the vertical axis represents the average aspect ratio. FIG. 35 is a graph showing an average aspect ratio of martensite blocks belonging to the third group and the fifth group in the vicinity of the surface of each of sample 6 and sample 8. It should be noted that in FIG. 35, the vertical axis represents the aspect ratio.

As shown in FIG. 34, in the vicinity of the surface of sample 5, the average aspect ratio of the martensite blocks belonging to the third group was about 2.8. As shown in FIG. 35, in the vicinity of the surface of sample 6, the average aspect ratio of the martensite blocks belonging to the third group was about 2.8. From this, it was confirmed that in each of sample 5 and sample 6, the average aspect ratio of the martensite blocks belonging to the third group fell within a range of more than or equal to 2.5 and less than or equal to 2.8.

As shown in FIG. 34, in the vicinity of the surface of sample 5, the average aspect ratio of the martensite blocks belonging to the fifth group was about 2.6. As shown in FIG. 35, in the vicinity of the surface of sample 6, the average aspect ratio of the martensite blocks belonging to the fifth group was about 2.6. From this, in each of sample 5 and sample 6, it was confirmed that the average aspect ratio of the martensite blocks belonging to the fifth group fell within a range of more than or equal to 2.4 and less than or equal to 2.6.

On the other hand, in the vicinities of the surfaces of sample 7 and sample 8, the average aspect ratios of the martensite blocks belonging to the third group were respectively about 3.2 and about 3.5. Moreover, in the vicinities of the surfaces of sample 7 and sample 8, the average aspect ratios of the martensite blocks belonging to the fifth group were respectively about 3.0 and about 3.1.

<Charpy Impact Test>

A Charpy impact test was performed to the following samples: a sample 9 prepared in accordance with the same method as that for each of sample 5 and sample 6 described above; and a sample 10 prepared in accordance with the same method as that for each of sample 7 and sample 8 described above. The Charpy impact test was performed according to JIS (JIS Z 2242: 2005). In each of sample 9 and sample 10, a U-notch was formed to have a notch depth of 2 mm and a notch bottom curvature radius of 1 mm.

Figure 36:
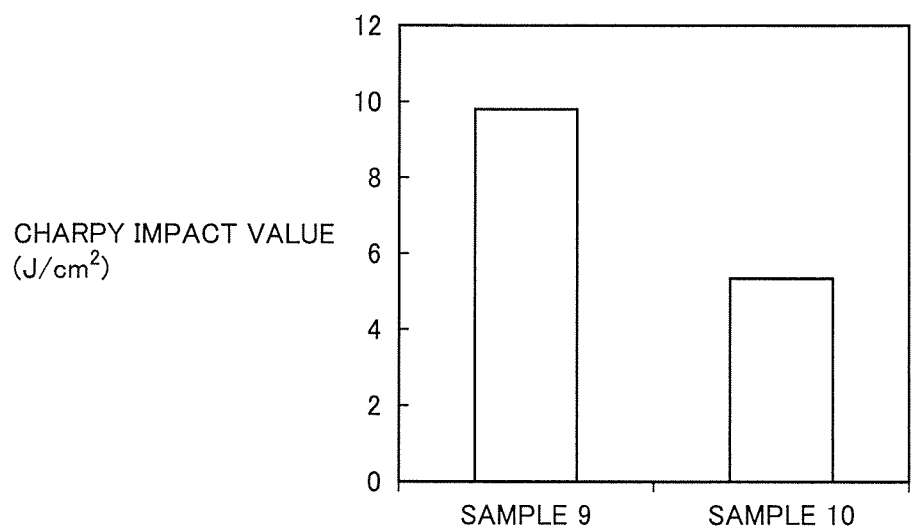
FIG. 36 is a graph showing a result of a Charpy impact test on each of a sample 9 and a sample 10.

FIG. 36 is a graph showing a result of the Charpy impact test on each of sample 9 and sample 10. It should be noted that in FIG. 36, the vertical axis represents a Charpy impact value (unit: J/cm$^2$). As shown in FIG. 36, it was confirmed that the Charpy impact value of sample 9 was 1.5 times or more as large as the Charpy impact value of sample 10.

Figure 37:
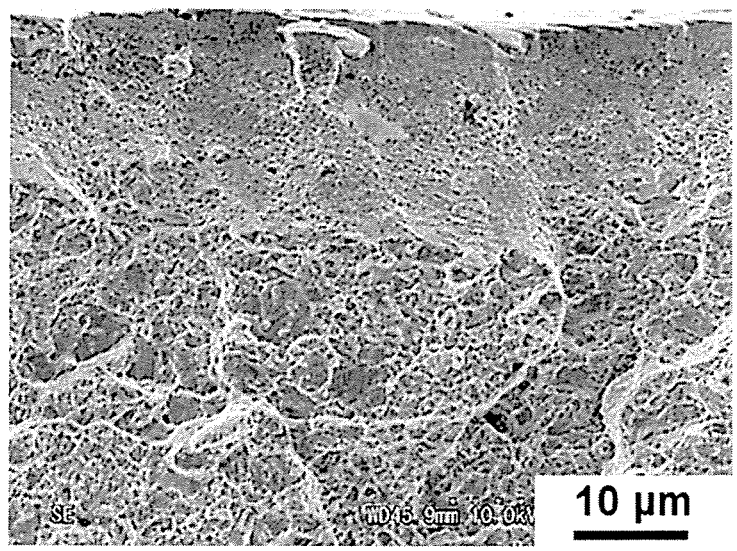
FIG. 37 is an electron microscope image of the notch-side surface of sample 9 after the Charpy impact test is performed.
Figure 38:
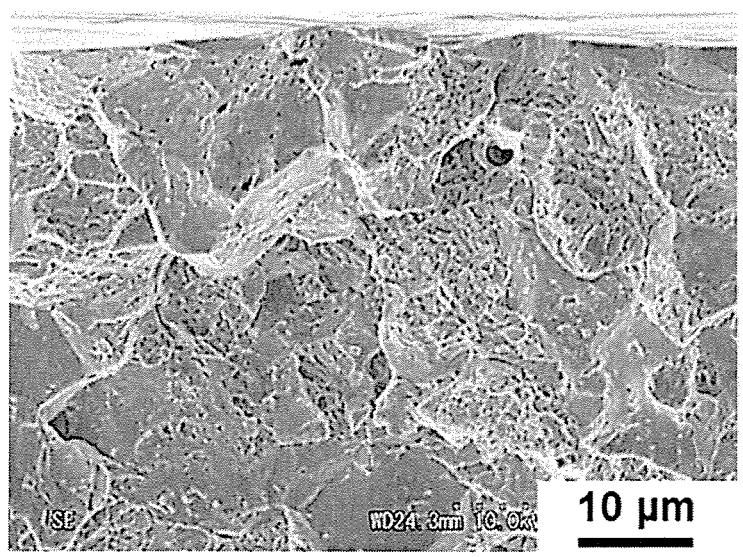
FIG. 38 is an electron microscope image of the notch-side surface of sample 10 after the Charpy impact test is performed.

FIG. 37 shows an electron microscope image in the notch-side surface of sample 9 after the Charpy impact test. FIG. 38 shows an electron microscope image in the notch-side surface of sample 10 after the Charpy impact test. It should be noted that in each of FIG. 37 and FIG. 38, the upper side corresponds to the notch side. As shown in FIG. 37, in the fractured surface after the Charpy impact test on sample 9, a multiplicity of dimples, which indicates occurrence of ductile fracture, were observed. On the other hand, as shown in FIG. 38, in the fractured surface after the Charpy impact test on sample 10, it was confirmed that such dimples were decreased and a fractured surface resulting from brittle fracture was exhibited.

<Rolling Fatigue Life Test Under Lubricating Condition with Foreign Matter Introduced>

Each of sample 11 and sample 12 was subjected to a rolling fatigue test under a lubricating condition with a foreign matter introduced (hereinafter, referred to as "rolling fatigue test"). Each of sample 11 and sample 12 is a tapered roller bearing of JIS 30206.

Each of the inner ring, outer ring, and tapered roller used in sample 11 was prepared by the same method as that for each of sample 5 and sample 6 described above. Each of the inner ring, outer ring, and tapered roller used in sample 12 was prepared by the same method as that for each of sample 5 and sample 6 described above. The lubrication in the rolling fatigue test was bath lubrication employing turbine oil VG56. A load in the rolling fatigue test was set to 17 kN, and an outer ring temperature was set to 65° C. In the rolling fatigue test, the inner ring was rotated at a rotating speed of 2000 rpm with the outer ring being fixed.

In the rolling fatigue test, evaluations were made in accordance with: the $L_{10}$ life (test time when a period of time from the start of the test until occurrence of flaking was statistically analyzed and a cumulative failure probability was 10%); and the $L_{50}$ life (test time when a period of time from the start of the test until occurrence of flaking was statistically analyzed and the cumulative failure probability was 50%).

Figure 39:
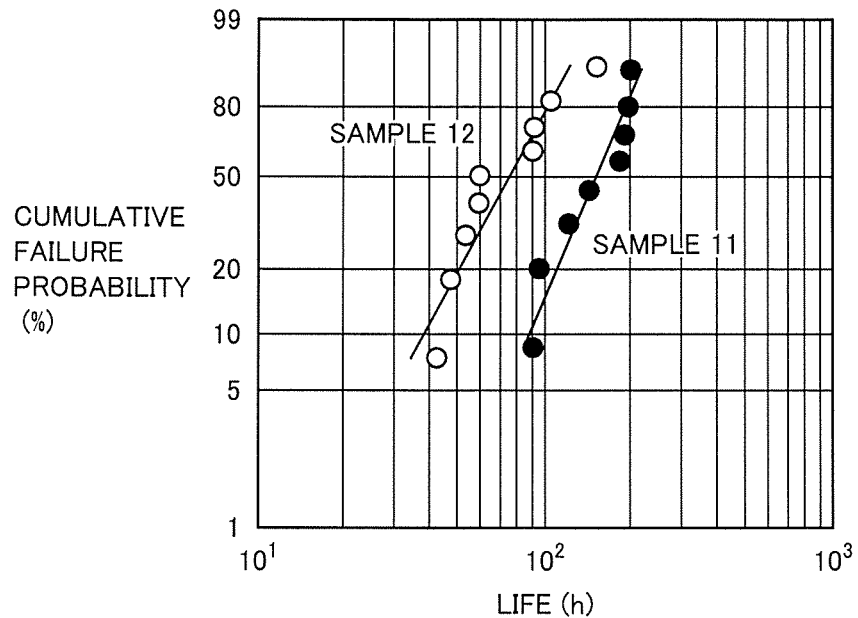
FIG. 39 is a graph showing a result of a rolling fatigue test on each of a sample 11 and a sample 12.

FIG. 39 is a graph showing a result of the rolling fatigue test on each of sample 11 and sample 12. It should be noted that in FIG. 39, the horizontal axis represents the life (unit: time), and the vertical axis represents the cumulative failure probability (unit: %). As shown in FIG. 39, in sample 11, the $L_{10}$ life was 89 hours, and the $L_{50}$ life was 152 hours. On the other hand, in sample 12, the $L_{10}$ life was 38 hours, and the $L_{50}$ life was 76 hours. Thus, it was confirmed that sample 11 had a long rolling fatigue life twice or more as large as that of sample 12.

<Wear Test>

A wear test was performed to the following samples: a sample 13 prepared in accordance with the same method as that for each of sample 5 and sample 6 described above; and a sample 14 prepared in accordance with the same method as that for each of sample 7 and sample 8 described above. The wear test was performed using a Savin type wear testing machine. Each of sample 13 and sample 14 had a flat-plate-like shape, and had a surface roughness (arithmetic mean roughness) Ra of 0.010 μm. A load in the test was set to 50 N and the relative speed with respect to a counterpart material was set to 0.05 m/s. The test time was set to 60 minutes, and Mobil Velocite Oil No. 3 (registered trademark) (VG2) was used for the lubricating oil. In the wear test, wear resistance was evaluated by calculating a specific wear amount from a wear amount of each sample having been through the test.

Figure 40:
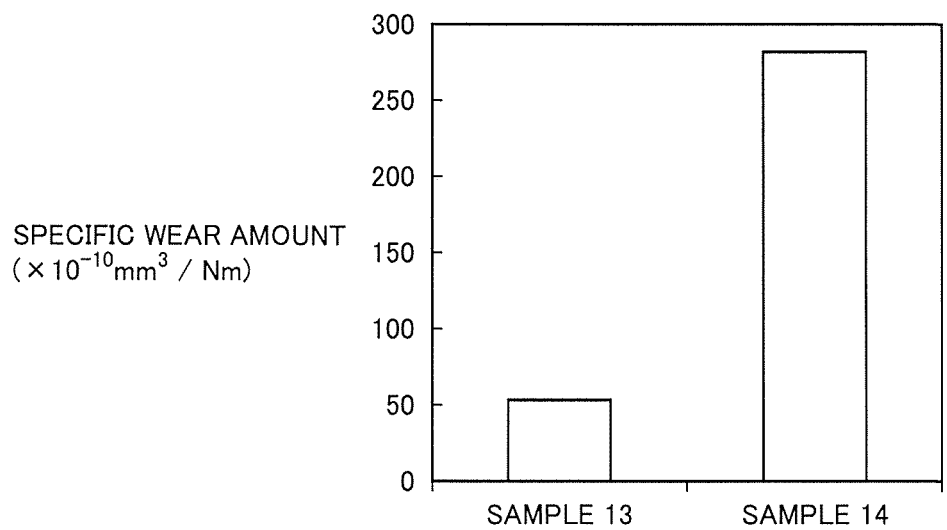
FIG. 40 is a graph showing a result of a wear test on a sample 13 and a sample 14.

FIG. 40 is a graph showing a result of the wear test on each of sample 13 and sample 14. In FIG. 40, the vertical axis represents the specific wear amount (unit: $10 \times 10^{-10}$ $mm^3/N \cdot m$). As shown in FIG. 40, the specific wear amount in sample 13 was about 20% of the specific wear amount in sample 14.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST 10, 120: outer ring; 10A, 120a: outer ring raceway surface (inner circumferential surface); 10B, 11B, 12B: surface region; 11, 110: inner ring; 11A, 110b: inner ring raceway surface (outer circumferential surface); 12, 130: ball (rolling element); 12A, 130a: ball rolling contact surface (surface); 13, 140: cage; 100: rolling bearing; 111: diffusion layer; 121: diffusion layer.

The invention claimed is:

1. A bearing part composed of a chromium molybdenum steel, the bearing part comprising a raceway surface or a rolling contact surface, wherein
a plurality of compound grains each composed of at least one of a carbide, a nitride, and a carbonitride exist in one of the raceway surface and the rolling contact surface,
an area ratio of the plurality of the compound grains in the raceway surface or the rolling contact surface is more than or equal to 3%,
an average grain size of the plurality of the compound grains in the raceway surface or the rolling contact surface is less than or equal to 0.3 μm, and
the chromium molybdenum steel is SCM435 defined in JIS,
the one of the raceway surface and the rolling contact surface includes a diffusion layer,
the diffusion layer includes the plurality of compound grains and a plurality of martensite blocks,
an area ratio of the plurality of the compound grains in the diffusion layer is more than or equal to 3%, and
a maximum grain size of the plurality of martensite blocks is less than or equal to 3.8 μm.

2. The bearing part according to claim 1, wherein
the plurality of martensite blocks include martensite blocks each having a crystal grain size of less than or equal to 1.0 μm and constituting a first group, and
a value obtained by dividing a total area of the martensite blocks belonging to the first group by a total area of the plurality of martensite blocks is more than or equal to 0.55 and less than or equal to 0.75.

3. The bearing part according to claim 1, wherein
the plurality of martensite blocks include martensite blocks belonging to a second group, and martensite blocks belonging to a third group,
a minimum value of crystal grain sizes of the martensite blocks belonging to the third group is larger than a maximum value of crystal grain sizes of the martensite blocks included in the second group,
a value obtained by dividing a total area of the martensite blocks belonging to the third group by a total area of the plurality of martensite blocks is more than or equal to 0.5,
a value obtained by dividing, by the total area of the plurality of martensite blocks, a total area of the martensite blocks belonging to the third group except for a martensite block that has a maximum crystal grain size and that belongs to the third group is less than 0.5, and
an average grain size of the martensite blocks belonging to the third group is more than or equal to 0.7 μm and less than or equal to 1.4 μm.

4. The bearing part according to claim 1, wherein
the plurality of martensite blocks include martensite blocks belonging to a fourth group, and martensite blocks belonging to a fifth group,
a minimum value of crystal grain sizes of the martensite blocks belonging to the fifth group is larger than a maximum value of crystal grain sizes of the martensite blocks included in the fourth group,
a value obtained by dividing a total area of the martensite blocks belonging to the fifth group by a total area of the plurality of martensite blocks is more than or equal to 0.7,
a value obtained by dividing, by the total area of the plurality of martensite blocks, a total area of the martensite blocks belonging to the fifth group except for a martensite block that has a maximum crystal grain size and that belongs to the fifth group is less than 0.7, and
an average grain size of the martensite blocks belonging to the fifth group is more than or equal to 0.6 μm and less than or equal to 1.1 μm.

5. The bearing part according to claim 1, wherein
the plurality of martensite blocks include martensite blocks belonging to a second group, and martensite blocks belonging to a third group,
a minimum value of crystal grain sizes of the martensite blocks belonging to the third group is larger than a maximum value of crystal grain sizes of the martensite blocks included in the second group,
a value obtained by dividing a total area of the martensite blocks belonging to the third group by a total area of the plurality of martensite blocks is more than or equal to 0.5,
a value obtained by dividing, by the total area of the plurality of martensite blocks, a total area of the martensite blocks belonging to the third group except for a martensite block that has a maximum crystal grain size and that belongs to the third group is less than 0.5, and
an average aspect ratio of the martensite blocks belonging to the third group is more than or equal to 2.5 and less than or equal to 2.8.

6. The bearing part according to claim 1, wherein
the plurality of martensite blocks include martensite blocks belonging to a fourth group, and martensite blocks belonging to a fifth group,
a minimum value of crystal grain sizes of the martensite blocks belonging to the fifth group is larger than a maximum value of crystal grain sizes of the martensite blocks included in the fourth group,
a value obtained by dividing a total area of the martensite blocks belonging to the fifth group by a total area of the plurality of martensite blocks is more than or equal to 0.7,
a value obtained by dividing, by the total area of the plurality of martensite blocks, a total area of the martensite blocks belonging to the fifth group except for a martensite block that has a maximum crystal grain size and that belongs to the fifth group is less than 0.7, and an average aspect ratio of the martensite blocks belonging to the fifth group is more than or equal to 2.4 and less than or equal to 2.6.

7. The bearing part according to claim 1, wherein an average grain size of prior austenite crystal grains in the raceway surface or the rolling contact surface is less than or equal to 8 μm.

8. The bearing part according to claim 1, wherein the compound grains include $(Fe,Cr)_3(C,N)$.

9. The bearing part according to claim 1, wherein an average carbon concentration of a shallow layer region extending from the raceway surface or the rolling contact surface to a depth of 10 μm is more than or equal to 0.7 weight %, and an average nitrogen concentration of the shallow layer region is more than or equal to 0.2 weight %.

10. A rolling bearing comprising:
    an outer ring;
    an inner ring disposed at an inner side relative to the outer ring; and
    a plurality of rolling elements arranged between the outer ring and the inner ring, wherein
    at least one of the outer ring, the inner ring, and the rolling elements is the bearing part recited in claim 1.

11. A method for manufacturing the bearing part of claim 1, the method comprising:
    preparing a formed body composed of a chromium molybdenum steel;
    carbonitriding the formed body by heating the formed body to more than or equal to 930° C. and less than or equal to 940° C. in a carbonitriding atmosphere including ammonia;
    primarily quenching the carbonitrided formed body by heating the formed body to a primary quenching temperature of more than 850° C. and less than 930° C. and then cooling the formed body to a temperature of less than or equal to a Ms point;
    secondarily quenching the primarily quenched formed body by heating the formed body to a secondary quenching temperature of more than or equal to an Ai point and less than 850° C. and then cooling the formed body to the temperature of less than or equal to the Ms point, thereby producing the bearing part of claim 1.

12. The method for manufacturing the bearing part according to claim 11, wherein
    the primary quenching temperature is more than or equal to 860° C. and less than or equal to 880° C., and
    the secondary quenching temperature is more than or equal to 820° C. and less than or equal to 840° C.

* * * * *